United States Patent
Doganata et al.

(10) Patent No.: US 9,860,190 B2
(45) Date of Patent: *Jan. 2, 2018

(54) ADAPTIVE ALGORITHM FOR CLOUD ADMISSION POLICIES

(71) Applicant: International Business Machines Corporation, Armonk, NY (US)

(72) Inventors: Yurdaer N. Doganata, Chestnut Ridge, NY (US); Malgorzata Steinder, Leonia, NJ (US); Asser N. Tantawi, Somers, NY (US); Merve Unuvar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,755

(22) Filed: Mar. 31, 2016

(65) Prior Publication Data
US 2016/0212062 A1 Jul. 21, 2016

Related U.S. Application Data

(63) Continuation of application No. 13/966,792, filed on Aug. 14, 2013, now Pat. No. 9,391,919.

(51) Int. Cl.
*G06F 15/16* (2006.01)
*H04L 12/911* (2013.01)
(Continued)

(52) U.S. Cl.
CPC ............ *H04L 47/78* (2013.01); *G06F 9/5083* (2013.01); *G06F 2009/4557* (2013.01); *G06F 2209/5019* (2013.01)

(58) Field of Classification Search
CPC ............ G06F 9/455; G06F 2209/5019; G06F 2009/4557; G06F 9/5083; H04L 12/911; H04L 47/78
See application file for complete search history.

(56) References Cited

U.S. PATENT DOCUMENTS 8,291,411 B2 10/2012 Beaty et al.
8,402,140 B2 3/2013 Zhang et al.
(Continued)

FOREIGN PATENT DOCUMENTS

EP 1039699 9/2000
EP 1208485 5/2002

OTHER PUBLICATIONS

Aldo, O., et al., "Performance of Distributed Call Admission Control for Multimedia High Speed Wireless/Mobile ATM Networks", IEEE International Conference on Communications, Jun. 6-10, 1999, pp. 1-5, vol. 3.
(Continued)

*Primary Examiner* — Benjamin M Thieu
(74) *Attorney, Agent, or Firm* — Fleit Gibbons Gutman Bongini Bianco PL; Jon A. Gibbons

(57) ABSTRACT

Disclosed is a novel system and method for managing requests for an additional virtual machine. The method begins with operating at least one virtual machine accessing at least one computer resource associated with at least one physical machine within a computing cluster. One or more non-deterministic virtual machine requests for the computer resource are received. An over-utilization of the computer resource as a probability distribution function is modeled. In one example, the probability distribution function is a Beta distribution function to represent a one of a plurality of probability distribution functions. Next, an additional virtual machine on the physical machine associated with the computer resource is added in response to a probability of a utilization of the computer resource being greater than a probalistic bound on the over-utilization of the computer resource. Otherwise, the additional virtual machine is not added.

20 Claims, 13 Drawing Sheets

(51) Int. Cl.
G06F 9/50 (2006.01)
G06F 9/455 (2006.01)

(56) References Cited

U.S. PATENT DOCUMENTS

| | | | |
|---|---|---|---|
| 8,490,091 B2 | 7/2013 | Bozek et al. | |
| 2011/0173329 A1* | 7/2011 | Zhang | G06F 1/3206 709/226 |
| 2011/0264805 A1 | 10/2011 | Breitgand et al. | |
| 2012/0284408 A1 | 11/2012 | Dutta et al. | |
| 2013/0238780 A1* | 9/2013 | Devarakonda | G06F 9/5072 709/224 |
| 2014/0173601 A1* | 6/2014 | Talia | G06F 9/45533 718/1 |
| 2014/0310390 A1 | 10/2014 | Sorenson, III | H04L 47/10 709/223 |
| 2014/0310391 A1 | 10/2014 | Sorenson, III | H04L 45/24 709/223 |
| 2014/0310418 A1 | 10/2014 | Sorenson, III | H04L 67/1002 709/226 |

OTHER PUBLICATIONS

Coffman, E.G., Jr., et al., "A Stochastic Model of Bin-Packing," Information and Control, 44, 105-115, 0019-9958/80/020105-11, Copyright 1980 by Academic Press, Inc.
Rheem W.T., "Optimal Bin Packing with Items of Random Sizes," Mathematics of Operations Research, vol. 13, No. 1, Feb. 1988, pp. 140-151.

* cited by examiner

ADAPTIVE ALGORITHM FOR CLOUD ADMISSION POLICIES

CROSS-REFERENCE TO RELATED APPLICATIONS

This application is based upon and claims priority from prior U.S. patent application Ser. No. 13/966,792, filed on Aug. 14, 2013, now [allowed], the entire disclosure of which is herein incorporated by reference in its entirety.

BACKGROUND

The present invention generally relates to cloud computing, and more specifically to managing the admission of virtual machines in a cloud environment with dynamic resource demands.

In a Cloud or computing cluster system managing the utilization of computer resources with effective admission control policies is essential. Admission control policies ensure that sufficient resources are available in a cluster to provide fail-over protection and to ensure that virtual machine resource reservations are respected. If the additional computer resources are not reserved, the power-on attempt fails and the fail-over protections cannot be realized. Hence, admission control policies reserve resources to ensure robustness for a potential fail-over and successful power-on procedures.

Each resource in a physical machine in the Cloud system has an over-utilization threshold. When this threshold is exceeded and the resources are over-utilized for longer periods of time, operations of physical machines may be interrupted or migration may become necessary. Over-utilization threshold is the maximum acceptable utilization percentage for a resource. As an example, if the over-utilization threshold is 90%, it is assumed that the operations will not be interrupted, as long as the resource utilization remains below 90%. In addition to over-utilization threshold, the likelihood of the resource being over-utilized is another parameter to be considered for the purpose of admission control. The second threshold is the percentage of time that the over-utilization can be tolerated. In other words, the likelihood of finding the resource over-utilized. Note that the over-utilization threshold can be exceeded for short periods of time. If the likelihood of fail-over or the virtual machine power-on is negligible, exceeding the over-utilization threshold may be tolerated.

Admission control policies adopt admission criteria by which admission control schema accepts or rejects a request to be placed in the Cloud. In general, admission control schemas are either parameter-based or measurement-based. Parameter-based admission control schemas are based on apriori knowledge of the input requests and provide for deterministic guarantees for uninterrupted Cloud operations. Examples of this type of admission control schemas include admitting a VM request based on its resource demand characteristics, such as maximum resource demand or average resource demand. Parameter-based schemas are easy to implement and guarantee Cloud operations under worst-case assumptions. A measurement-based admission control schema, on the other hand, utilizes the estimated resource utilization of physical machines in addition to input VM request parameters. In this case, the utilization of a resource is characterized by its stochastic properties and a probabilistic bound can be defined for the potential interruptions of Cloud operations. The probability density function (pdf) of the utilization of a resource is the convolution of all the resource demands of the accepted requests that utilize that resource. In such aggregation of independent resource demands, the probability that the aggregate utilization will reach the sum of the peak demand is infinitesimally small. Using the pdf of the aggregated resource utilization in admission criteria provides for probabilistic guarantees. That is, instead of providing deterministic bound for the worst case scenarios, measurement-based admission control policies guarantee a bound on the probability of over-utilization. In mathematical terms, resource k is stable if its utilization, $U_k$, satisfies the following constraint, $$P(U_k > U_k^o) \leq \epsilon^o \qquad (1)$$

where $U^o$ is the over-utilization threshold and $\epsilon^o$ is the probabilistic bound on over-utilization.

BRIEF SUMMARY

We consider the problem of admitting sets of, possibly heterogeneous, virtual machines (VMs) with stochastic resource demands onto physical machines (PMs) in a Cloud environment. The objective is to achieve a specified quality-of-service related to the probability of resource over-utilization in an uncertain loading condition, while minimizing the rejection probability of VM requests. We introduce a method which relies on approximating the probability distribution of the total resource demand on PMs and estimating the probability of over-utilization. We compare our method to two simple admission policies: admission based on maximum demand and admission based on average demand. We investigate the efficiency of the results of using our method on a simulated Cloud environment where we analyze the effects of various parameters (commitment factor, coefficient of variation etc.) on the solution for highly variate demands.

Disclosed is an automated system and method for managing requests for an additional virtual machine. The method begins with operating at least one virtual machine accessing at least one computer resource associated with at least one physical machine within a computing cluster. One or more non-deterministic virtual machine requests for the computer resource are received. An over-utilization of the computer resource as a probability distribution function is modeled. In one example, the probability distribution function is a Beta distribution function to represent a one of a plurality of probability distribution functions. Next, an additional virtual machine on the physical machine associated with the computer resource is added in response to a probability of a utilization of the computer resource being less than a probalistic bound on the over-utilization of the computer resource. Otherwise, the additional virtual machine is not added. The probability distribution function is automatically updated in response to an additional non-deterministic virtual machine request, a change in the utilization of the computer resource by the virtual machine, a change in the utilization of the computer resource by any additional virtual machine which has been added, or a combination thereof. Likewise, based on the probability distribution function being updated, reevaluating the admission of the additional virtual machine on the physical machine associated with the computer.

In one example, the probability of the utilization of the computer resource is less than an over-utilization threshold $U_k^*$ is given by $F_{Z_k^n}(U_k^*) \geq \epsilon_k$ where the computer resource k associated with the physical machine, the probabilistic bound is $\epsilon_k$, and $F_{Z_k^n}$ is a function of a sum of n independent $k^{th}$ resource demands. The probalistic bound $\epsilon_k$, and/or the over-utilization threshold is $U_k^*$ is set, typically by a Cloud system administrator or user, based on an operating specification of the physical machine.

In another example, a maximum number of allowed concurrent computer resource requests in a policy for the physical machine is given by a minimum of a supreme subset of independent computational resource requests and the probability of the utilization of the computer resource. The maximum number of allowed concurrent computer resource requests $N_{max}$ in a policy is given by $$N_{max} = \min_{k \in K}\{sup\{n \mid F_{Z_k^n}(U_k^*) \geq (1-\varepsilon_k)\}\},$$

where sup is a supremum subset and n is a sum of independent $k^{th}$ computer resource request.

In yet another example, an over commitment placement policy with a maximum value of demand is given by $$N_{max} = \min_K \left\{ \left\lfloor \frac{KC_k}{D_k^{max}} \right\rfloor \right\}$$

and a value of κ is solved by using $N_{max}$, where, $D_k^{max}$ is a maximum demand on computer resource k, and, $C_k$ is a capacity for the computer resource k.

In still another example, an under commitment policy with an average value of demand is given by $$N_{max} = \min_K \left\{ \left\lfloor \frac{\theta C_k}{\mu_{D_k}} \right\rfloor \right\}$$

and a value of θ is solved by using $N_{max}$, where $D_k^{max}$ is a maximum demand on computer resource k, and, $C_k$ is a capacity for the computer resource k.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
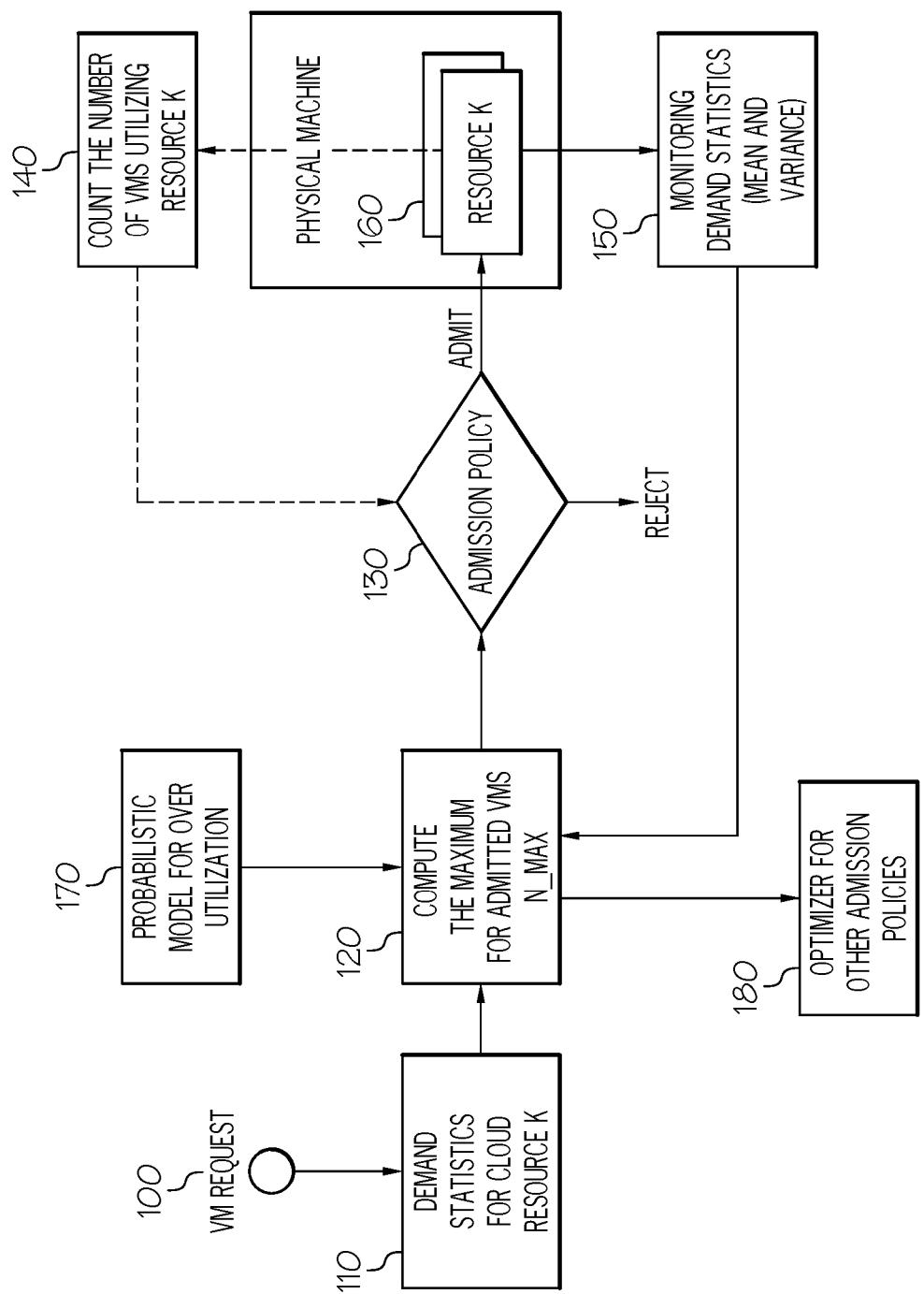
FIG. 1 is a system architecture.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, integers, steps, operations, elements, components, and/or groups thereof.

Overview

The behavior of various admission control policies under dynamic resource demand is investigated. Introduced is a method for configuring admission control policies against over-utilization. A measurement-based admission control policy for the Cloud is described by approximating the pdf of the aggregated resource utilization using the first and second moments. Then, we employ (1) as the admission criterion to decide if the statistical properties of an arriving VM request will likely to drive the physical machine into over-utilization. Thus, we enforce an admission criterion that guarantees a bound on the probability of over-utilization. We compare the performance of two parameter-based admission control policies against a measurement-based control policy that we introduce. We also show how to configure the parameter-based admission control policies by using the probabilistic bound of the measurement-based policy. Note that parameter-based approaches provide a deterministic bound against worst case scenarios and their admission criteria do not change with the variations of resource demand. We also show how much parameter-based control policies are sensitive to variations in dynamic resource demand. Novelty includes the use of stochastic properties of resources for managing resource utilization.

We describe the problem formulation in Section 1.0. Two parameter-based and one measurement-based admission control policies are introduced in Section 2.0. In Section 3.0 we describe how to configure the admission control criteria to reduce the likelihood of over-utilization. Our simulation results are presented in Section 4.0. Section 5.0 discusses the Choice of Beta Distribution and Section 6.0 the parameters of the Beta distribution. Section 7.0 discusses adding a VM. The Distribution of the number of requests accommodated in the Cloud is discussed in Section 8.0. High level flow charts are discussed in Section 9.0. Other techniques are reviewed in Section 10 followed by conclusions in Section 11.0. Section 12.0 is an explanation of a generalized Cloud computing environment in which the claimed invention may be practiced.

Overall System Diagram

Turning now to FIG. 1, shown is an overall system diagram. For every VM request 100, the mean and the variance of the demand for resource k is recorded in 110. This information is used in "Compute the maximum VMs" 120 to compute the maximum number of VMs, $N_{max}$, demanding resource k that can be accommodated in physical machine 160. Maximum number of VMs is the number of VMs that are accommodated without exceeding the probability of overutilization for resource k beyond a threshold. This can be computed by using a probabilistic model 170 for resource utilization based on the mean and the variance of utilization of resource k. The mean and the variance of the utilization for resource k is monitored in 150. For every VM request arrival 100, the mean and the variance is incremented by the amount of arrival's mean demand and variance. How to compute the maximum number of VMs accommodated by the system is explained in the embodiment. Admission Policy 130 may use the counter for the number of admitted VMs 140 to determine if the with the new request $N_{max}$, will be exceeded. If the new arrival causes the maximum number in the system exceeds $N_{max}$, the request is rejected. 180 takes the $N_{max}$, value calculated by our method to optimize the parameters for other policies (i.e. overcommitment, undercommitment etc.).

1.0 Formulation and Analysis 1.1. Homogenous System

Consider p homogenous PMs with K different resources with each having capacity $C_k$, subjected to a stream of homogenous requests with a Poisson arrival process with rate $\lambda$ and a generally distributed lifetime with mean $\tau$. A request has a demand $D_k$ for resource k that is generally distributed with distribution function $F_{D_k}(d_k)=Pr[D_k \leq d_k]$, where $d_k \in [D_k^{min}, D_k^{max}]$. Without loss of generality we assume that $D_k^{min}=0$ and $D_k^{max}>0$. We denote the mean and standard deviation of the demand for resource k by $\mu_{D_k}$ and $\sigma_{D_k}$, respectively. Hence, the mean offered load for the $k^{th}$ resource is given by $$\rho_k = \lambda \tau \mu_{D_k}. \qquad (2)$$

Let $Z_k^n$ denote the sum of n independent $k^{th}$ resource demands. Given that $Z_k^n = n\, D_k$, the mean of $Z_k^n$ is $E[Z_k^n]=n\,\mu_{D_k}$, the variance is $V[Z_k^n]=n\,\sigma_{D_k}^2$, and the probability distribution, denoted by $F_{Z_k^n}(Z_k)$, is the n-fold convolution of $F_{D_k}(d_k)$.

1.2. Heterogeneous System

The same notations can be extended to a system that is subjected to heterogeneous requests. A request type is characterized by the amount of demand for resources. A request is classified to type i=1, 2, . . . , I, where I is the number of types. Let the system consist of, as before, p homogenous PMs with each having $C_k$ capacity for the resource type k. A type i request has a demand of $D_{ik}$ for the resource k with mean and standard deviation of $\mu_{D_{ik}}$ and $\sigma_{D_{ik}}$, respectively, and a distribution function of $F_{D_{ik}}(d_{ik})=Pr[D_{ik} \leq d_{ik}]$, where $d_{ik} \in [D_{ik}^{min}, D_{ik}^{max}]$. Similar to the homogenous system, we assume that $D_{ik}^{min}=0$ and $D_{ik}^{max}>0$. Let $\lambda_i$ represents the mean arrival rate for Poisson arrivals and $\tau_i$ represent the generally distributed mean lifetime of the $i^{th}$ request type. Hence, the mean offered load for a given type i for the $k^{th}$ resource is given by $$\rho_{ik} = \lambda_i \tau_i \mu_{D_{ik}}. \qquad (3)$$

The total mean offered load for resource k is:

$$\rho_k = \Sigma_{i=1}^{I} \rho_{ik} = \Sigma_{i=1}^{I} \lambda_i \tau_i \mu_{D_{ik}}. \qquad (4)$$

Let $n=(n_1, n_2, \ldots, n_I)$ denote the number of requests of each of the I types in the system. Given n, the sum of independent $k^{th}$ resource demands in the heterogenous system, $Z_k^n$ is given by, $Z_k^n = \Sigma_{i=1}^{I} n_i\, D_{ik}$ where $n_i$ represents the number of type i requests. The mean of $Z_k^n$ is $E[Z_k^n]=\Sigma_{i=1}^{I} n_i \mu_{D_{ik}}$, the variance is $V[Z_k^n]=\Sigma_{i=1}^{I} n_i\, \sigma_{D_{ik}}^2$, and the probability distribution, denoted by $F_{Z_k^n}(Z_k)$, is the convolution of $F_{D_{ik}}(d_{ik})$ over i.

2.0 Cloud Admission Policies

An admission controller admits a request into the Cloud based on some policy $\mathbb{P}(\overline{\varphi})$, with a set of parameters $\overline{\varphi}$ used in admission criteria. The parameter set $\overline{\varphi}$ includes elements that characterize the requests, such as the maximum demand, average demand and elements that characterize the resources in the cloud such as resource capacity. As discussed in the Introduction section, if the admission criterion uses fix parameter values based on the characterization of the input request and the Cloud resource, we call the admission policy parameter based. On the other hand, if the admission criterion uses measurements to capture the stochastic nature of the current state, such as the mean and the variance of resource utilization, we call it measurement based.

In this section, for the sake of simplicity, we detail the description of policies for homogenous system only. In section 4, we show how these policies can be extended to a heterogeneous system without loss of generality. In parameter based admission control policies, the maximum number of requests that can be accommodated by the Cloud for each resource k is denoted by $N_k^{max}$. Let n be the number of requests in the PM at the time admission policy is applied. Thus, a request is admitted to a PM if $n < N_k^{max}$ and is rejected for that particular PM otherwise. If a request cannot be placed to any of the PMs, it is rejected from the Cloud. By using the resulting request rejection probability $\delta$, the mean utilization of $k^{th}$ resource $\overline{U_k}$ is calculated as $$\overline{U_k} = \frac{(1-\delta)\rho_k}{C_k p}. \quad (5)$$

We consider three policies from the class of admission policies described above. The first two admission control policies are parameter based and the third one is measurement based.

1. Admission based on the maximum value of demand with a commitment factor: $\mathbb{P}_1(\kappa, D_k^{max})$, where $D_k^{max}$ is the maximum demand for resource k, $\kappa$ is the commitment factor for the resources on a PM and $\kappa > 1$.
2. Admission based on the average value of the demand with a commitment factor: $\mathbb{P}_2(\theta, \mu_{D_k})$, where $\mu_{D_k}$ is the average demand of a request for resource k and $\theta$ is the commitment factor for the resources on a PM and $0 < \theta < 1$.
3. Admission based on a probabilistic bound over-utilization: $\mathbb{P}_3(U_k^*, \epsilon_k, \mu_k, \sigma_k)$, where $U_k^*$ is the utilization threshold and $\epsilon_k$ is the probabilistic bound on the over-utilization probability for resource k such that the probability of over-utilization being above $U_k^*$ is limited to $\epsilon_k$. $\mu_k$ and $\sigma_k$ are the mean and the variance of the utilization for resource k.

Details of these three different admission policies are explained below.

2.1 Policy 1: Admission Based on the Max. Value of Demand with a Commitment Factor In this admission control policy, the maximum demand values for the resources are taken into account for admission decision. Let us denote this policy with $\mathbb{P}_1(\kappa, D_k^{max})$, where $\kappa$ is the commitment factor for all types of resources and $D_k^{max}$ is the maximum value of the demand for resource type k. The respective maximum allowed concurrent requests $N_{max}(\mathbb{P}_1)$ in a PM for this admission policy is $$N_{max}(\mathbb{P}_1) = \min_{k \in K} \left\{ \left\lfloor \frac{KC_k}{D_k^{max}} \right\rfloor \right\}. \quad (6)$$

Here K is the number of resources a request is demanding in a physical machine, PM. This policy accepts requests to a PM as long as the total number of requests in the PM is less than or equal to $N_{max}(\mathbb{P}_1)$ at the time of admission. $N_{max}(\mathbb{P}_1)$ is the maximum number of requests that can be accommodated without over-committing any of the resources beyond $\kappa$.

In this policy, the commitment factor, $\kappa$ is used to prevent the under-utilization of a resource on a PM. Since the accepted requests are not always demanding their maximum value, selecting $\kappa > 1$ reduces under-utilization. The performance of the Cloud depends on selecting the $\kappa$ value properly. As long as the requests are demanding less than their maximum value, particular PM is guaranteed to function properly with $\kappa = 1$. This selection, however, will cause under-utilization of the resources. On the other hand, if the VMs that are accepted to that PM demand their maximum values and when $\kappa > 1$, then resources on PM face an over-utilization since total demand exceeds the resource capacity. This problem causes "crashing" on the physical machine if particular resource is a memory. Higher the $\kappa$ values, the more likely for $\mathbb{P}_1$ to accept VMs thus more likely to over-utilize a resource on a PM.

Note that selecting a value for $\kappa$ provides a deterministic bound on the number of requests to be accepted. In order to utilize the resources effectively, $\kappa$ value needs to be adjusted against the stochastic variations of resource utilization. In practice, it is not common to change the $\kappa$ values frequently.

2.2 Policy 2: Admission Based on the Avg. Value of the Demand with Commitment Factor In this admission policy, the average demand of a VM request is taken into account for admission decision. Let us denote this policy with $\mathbb{P}_2(\theta, \mu_{D_k})$, where $\theta$ is the commitment factor for all resources and $\mu_{D_k}$ is the mean value of the demand for the resource type k. The respective maximum allowed concurrent requests $N_{max}(\mathbb{P}_2)$ in a PM for this admission policy is $$N_{max}(\mathbb{P}_2) = \min_{k \in K} \left\{ \left\lfloor \frac{\theta C_k}{\mu_{D_k}} \right\rfloor \right\}. \quad (7)$$

In this admission control schema, requests are accepted to a PM as long as the total number of requests in the PM is less than or equal to $N_{max}(\mathbb{P}_2)$ at the time of admission.

The commitment factor, $\theta$ is used to prevent the over-utilization of resources on a PM since the accepted requests do not always demand their average value. This factor helps to maintain the utilization of resources on a PM to be under an upper limit for the times when the admitted requests demand higher than their average value. Usually, $\theta$ is selected as: $0 < \theta < 1$. Smaller the $\theta$ value, it is more likely to reject the requests thus less likely to over-utilize resources on a PM.

Note that $N_{max}(\mathbb{P}_2)$ is a deterministic bound. As in the case of $\mathbb{P}_1$, the parameter of $\mathbb{P}_2$, $\theta$, needs to be adjusted when the demand at a particular instance is different from the average demand, $\mu_{D_k}$ in order to maintain the utilization under a certain threshold. Frequent adjustments to $\theta$, however, is not practical as in case of Policy 1.

2.3 Policy 3: Admission Based on a Probabilistic Bound Over Utilization

In this admission policy, dynamic nature of a demand for a resource is represented with its mean, $\mu_{D_k}$ and standard deviation, $\sigma_{D_k}$. Let each PM consists of K resources, the utilization of each resource, $U_k$, is a random variable between [0,1] and characterized by its first and second moments:

$U_k$: $k^{th}$ resource utilization of PM where $k \leq K$
$\mu_k$: Mean of $U_k$
$\sigma_k$: Standard deviation of $U_k$ We approximate the probability distribution function (pdf) of $U_k$ as a Beta distribution since Beta distribution is a good approximation for the maximum entropy probability distribution for all classes of distributions with the same first and second moments (see Section 6 entitled "Parameters Of The Beta Distribution" for the reasoning of this assumption). Beta distribution is a family of continuous probability distributions defined on the interval [0,1] by two positive shape parameters, denoted by $\alpha$ and $\beta$. Hence, we also characterize the utilization $U_k$ with two parameters, $\alpha$ and $\beta$, associated with the first and second moments of $U_k$. For more information on Beta distribution, see Section 7 entitled "Adding A VM".

Admission criterion for Policy 3, $\mathbb{P}_3(U_k^*, \epsilon_k, \mu_k, \sigma_k)$, utilizes $U_k^*$, $\epsilon_k$, $\mu_k$ and $\sigma_k$ to make an admission decision. Here $U_k^*$ is the over-utilization threshold, $\epsilon_k$ is the probabilistic bound on over-utilization, $\mu_k$ and $\sigma_k$ are the estimated mean and the standard deviation of the measured utilization of resource k after the request arrival. The admission criterion for Policy 3 is given by $$F_{Z_k^n}(U_k^*) \geq (1-\epsilon_k) \quad (8)$$

If equation (8) is not satisfied with the new request arrival, the request is rejected. It is important to note that equation (8) can be also written as $F_{Z_k^n}(U_k^*) < \epsilon_k$, i.e. utilization of the computer resource being less than a probabilistic bound.

The respective maximum allowed concurrent requests $N_{max}(\mathbb{P}_3)$ in a PM for Policy 3 is expressed as:

$$N_{max}(\mathbb{P}_3) = \min_{k \in K}\{sup\{n \mid F_{Z_k^n}(U_k^*) \geq (1-\epsilon_k)\}\}. \quad (9)$$

Here $U_k \in [0,1]$ is the utilization of resource k and $U_k \sim$ Beta $(\alpha_k, \beta_k)$. As described in Appendix B, the corresponding $\alpha_k$ and $\beta_k$ values are found from the estimated mean and variance values of the utilization of resource k in the PM as:

$$\alpha_k = \overline{R}_k\left(\frac{\overline{R}_k(1-\overline{R}_k)}{\overline{S}_k^2} - 1\right) \quad (10)$$

$$\beta_k = (1-\overline{R}_k)\left(\frac{\overline{R}_k(1-\overline{R}_k)}{\overline{S}_k^2} - 1\right) \quad (11)$$

where $\overline{R}$ and $\overline{S}$ are estimations for $\mu_k$ and $\sigma_k$ respectively. Hence the cumulative distribution function $F_{Z_k^n}(U_k)$ for the utilization of resource k is expressed as:

$$F_{Z_k^n}(U_k, \alpha_k, \beta_k) = B(U_k, \alpha_k, \beta_k)/B(\alpha_k, \beta_k) \quad (12)$$

where B is the Beta function. Note that $N_{max}(\mathbb{P}_3)$ is not a deterministic bound, but it changes as the mean and the variance of the utilization change dynamically. Unlike $\mathbb{P}_1$ and $\mathbb{P}_2$, $\mathbb{P}_3$ does not need to be adjusted, since $\mathbb{P}_3$ is dynamically adjusted with the measured statistical properties of resource utilization. The predefined thresholds for $U_k^*$ and $\epsilon_k$ are set by the Cloud manager depending on the specifications of the physical machine.

3.0 Configuration of Admission Policies

3.1 Homogenous System

So far, we have obtained maximum allowed concurrent requests $N_{max}(\mathbb{P}_k)$ in a physical machine for each policy as:

1. $N_{max}(\mathbb{P}_1) = \min_K\left\{\left\lfloor\frac{KC_k}{D_k^{max}}\right\rfloor\right\}$ 2. $N_{max}(\mathbb{P}_2) = \min_K\left\{\left\lfloor\frac{\theta C_k}{\mu_{D_k}}\right\rfloor\right\}$ 3. $N_{max}(\mathbb{P}_3) = \min_K\{sup\{n \mid F_{Z_k^n}(U_k^*) \geq (1-\epsilon_k)\}\}$.

The first two are deterministic bounds for the number of concurrent requests that can be accommodated in the Cloud and the third one is a probabilistic bound. The first bound guarantees accommodation in the Cloud for requests with maximum demand $D_k^{max}$ on resource k with a commitment factor κ. Similarly, the second bound guarantees accommodation in the Cloud for requests with the average demand $\mu_{D_k}$ on resource k with a commitment factor θ. Note that these deterministic bounds cannot guarantee that resources will not be over-utilized. Also, there is no guarantee that the requests will be not be rejected as long as resources are available at the time arrival. This is merely because the first and the second admission control policies do not take into account the dynamic nature of the resource utilization of existing virtual machines in the Cloud. The third policy, however, uses the measured utilization statistics in the admission criterion, thus $N_{max}(\mathbb{P}_3)$ is continuously adjusted.

For the same request arrival process, all three policies perform the same when $N_{max}(\mathbb{P}_1) = N_{max}(\mathbb{P}_2) = N_{max}(\mathbb{P}_3)$. In this case, the rejection rate, as well as the overload factor, will be the same for all policies. As the statistical characteristics of PM resource utilization change, the over-utilization probability in Policy 3 remains below $\epsilon_k$. This is not the case for Policy 1 and 2. Regardless, over-utilization probabilities for the first two policies can be controlled by configuring κ and θ values using the measured resource utilization statistics and $N_{max}(\mathbb{P}_3)$.

Let the estimated mean and standard deviation of utilization be $\overline{\mu}_k$ and $\overline{\sigma}_k$ for resource k, respectively. The next request with demand statistics $\mu$ and $\sigma$ will increase the mean utilization to $\overline{\mu}_k^* = \overline{\mu}_k + \mu$ and the variance to $\overline{\sigma}_k^{2*} = \overline{\sigma}_k^2 + \sigma^2$. As a result, over-utilization probability after the new arrival is found as in (12), $$F_{Z_k^n}(U_k^*, \alpha_k^*, \beta_k^*) = Pr(U_k > U_k^*). \quad (13)$$

Here $\alpha_k^*$ and $\beta_k^*$ are found from the estimated mean and variance, $\overline{\mu}_k^*$ and $\overline{\sigma}_k^{2*}$, respectively, as explained in equations (10) and (11). If equation (13) is greater than the probabilistic bound $\epsilon_k$, then the request is rejected.

Assume that the resource utilization demand for all independent arrival requests have the same mean and variance, $\mu$ and $\sigma$, the probability of over-utilization for N concurrent requests is given by $$F_{Z_k^n}(U_k^*, \alpha_k(N), \beta_k(N)) = Pr(U_k(N) > U_k^*). \quad (14)$$

Here $U_k(N)$ is the resource utilization of N concurrent requests for the resource k. The parameters of the beta function $\alpha_k(N)$ and $\beta_k(N)$ are obtained from (10) and (11) by substituting $\overline{R} = N\mu_k$ and $\overline{S}^2 = N\sigma_k^2$. This yields the probabilistic bound $N_{max}(\mathbb{P}_3)$ as defined above. $N_{max}(\mathbb{P}_3)$ is the smallest number of concurrent requests that causes over-utilization for any resource k. Once $N_{max}(\mathbb{P}_3)$ is computed with estimated values of $\mu_k$ and $\sigma_k$, then the commitment factors for Policy 1 and 2 are found as follows:

$$K = \frac{N_{max}(\mathbb{P}_3)D_k^{max}}{C_k} \quad (15)$$

$$\theta = \frac{N_{max}(\mathbb{P}_3)\mu_{D_k}}{C_k}.$$

Since $\mathbb{P}_3$ considers the dynamic demand, it can be used to tune the parameters of the other policies. This forces the system to run with same rejection rate, thus with the same overload factor for all three policies. As the probability distribution function of requests, $F_{Z_k^n}$, changes, new $N_{max}(\mathbb{P}_3)$ values are calculated, thus new parameters for $\mathbb{P}_1$ and $\mathbb{P}_2$ are generated.

We have also shown how to compute the distribution of the number of requested arrivals in the Cloud by using independent arrival assumptions in Section 6.0 entitled "Distribution Of the Number Of Requests Accommodated in The Cloud" below. This approximation may be useful to estimate the under-utilization probabilities.

3.2 Heterogeneous System

For the heterogeneous case, admission controller still admits a request into a PM based on n, the number of requests in the PM at the time of admission policy $\mathbb{P}(\varphi)$ is applied. Denote the resulting request rejection probability by $\delta_i$, and the mean utilization of $k^{th}$ resource by $\overline{U_k}$. It is given by $$\overline{U_k} = \frac{\sum_{i=1}^{I}(1-\delta_i)\rho_{ik}}{C_k|PM|}. \quad (16)$$

The three policies that are described before are still applicable in the heterogeneous system with some modifications. The $N_{max}$ value that is calculated by policies now have a list of arrays where each array contains feasible combination of acceptable numbers of each type of VMs. Let $N_{max}{}^j$ represent one of the possible combination of feasible maximum vector for different types of VMs such that $N_{max}{}^j=\{n^1, \ldots, n^I\}$, where $n^i$ represents the number of allowed type i requests in the PM and there is a total of I types of requests. The $\overline{N_{max}}=\{N_{max}{}^1, \ldots, N_{max}{}^J\}$ represents all possible combinations of feasible admissions that will reveal the same maximum value and there is a total of J number of lists that satisfy the total maximum number of requests including all types.

Let the policies be now adjusted per request type i such that; $\mathbb{P}_1(\kappa, D_{ik}{}^{max})$, $\mathbb{P}_2(\theta, \mu_{D_{ik}})$, and $\mathbb{P}_3(U_k{}^*, \epsilon, \mu_{D_{ik}}, \sigma_{D_{ik}})$. Each of the above policies per type determines its respective maximum value on the allowed concurrent request type i by assuming that the number of other types of requests placed in the same physical machine is zero. In particular, we have an upper bound on $n^i$ values such that:

1. $n^i(\mathbb{P}_1) \leq \min_K \left\{ \left\lfloor \frac{kC_k}{D_{ik}^{max}} \right\rfloor \right\}$ 2. $n^i(\mathbb{P}_2) \leq \min_K \left\{ \left\lfloor \frac{\theta C_k}{\mu_{D_{ik}}} \right\rfloor \right\}$ 3. $n^i(\mathbb{P}_3) \leq \min_K \{sup\{n \mid F_{Z_k^n}(U_k^*) \geq (1-\epsilon_k)\}\}$ By using the relationships between upper limits and $D_{ik}$s, we can write the list of $\overline{N_{max}}=\{N_{max}{}^1, \ldots, N_{max}{}^J\}$ and construct admission decision based on these vectors.

4.0 Numerical Results 4.1 Description of Setup

We consider a Cloud with 15 PMs, each with a CPU capacity of 80 cores. There are two types of VM requests, small and large depending on their size hence we are working with a heterogeneous system. A small VM requires 2 CPU cores and a large VM requires 10 CPU cores on average. The variation in demand is characterized by the coefficient of variation with respect to demand and is in the range of 0.5 to 5 with 0.5 increments. The over-utilization threshold for CPU is set to 95% and it is not allowed for the utilization to violate this threshold more than 1% of time.

We simulate the above system, starting from an empty system, leading up to an offered loading of 95% average PM CPU utilization. VM requests arrive as a Poisson process and the lifetime of a VM is exponentially distributed in such a way to maintain the 95% average load. The mix of small and large VMs is governed by a Bernoulli process with probabilities 0.3 and 0.7, respectively.

We implemented the three policies under study. First, we investigated the impact of the parameters of the policy on its performance. Then, we compared the behavior of the policies with respect to demand variation. Later, we showed how to configure parameter based policies by using Policy 3.

4.2 Effect of Parameters on Mean Utilization

Figure 2A:
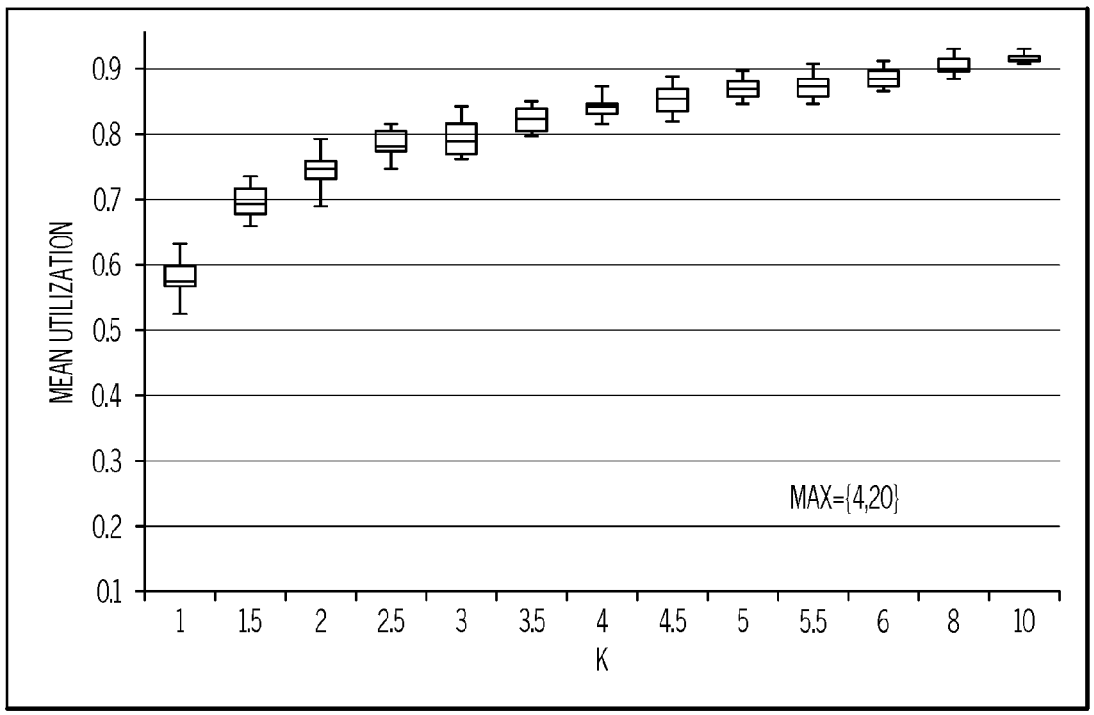
FIG. 2(a), FIG. 2(b), and FIG. 2(c) are a series of graphs illustrating a utilization in policy ($\mathbb{P}_1$) as a function of commitment factor κ.
Figure 2B:
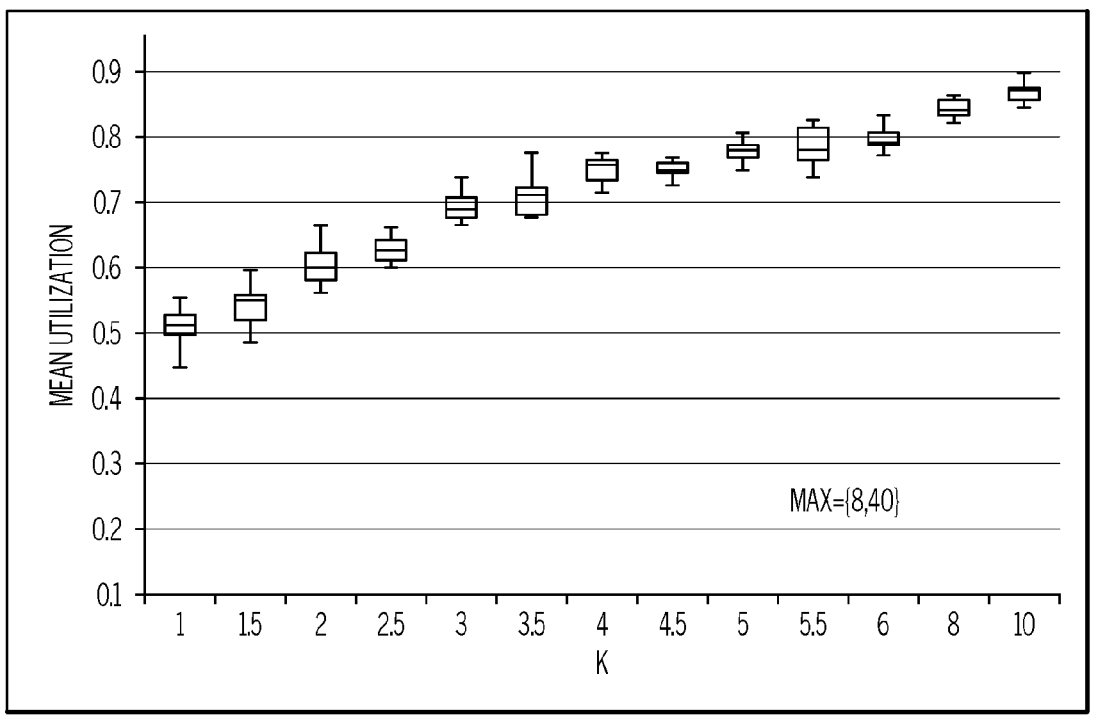
Figure 2C:
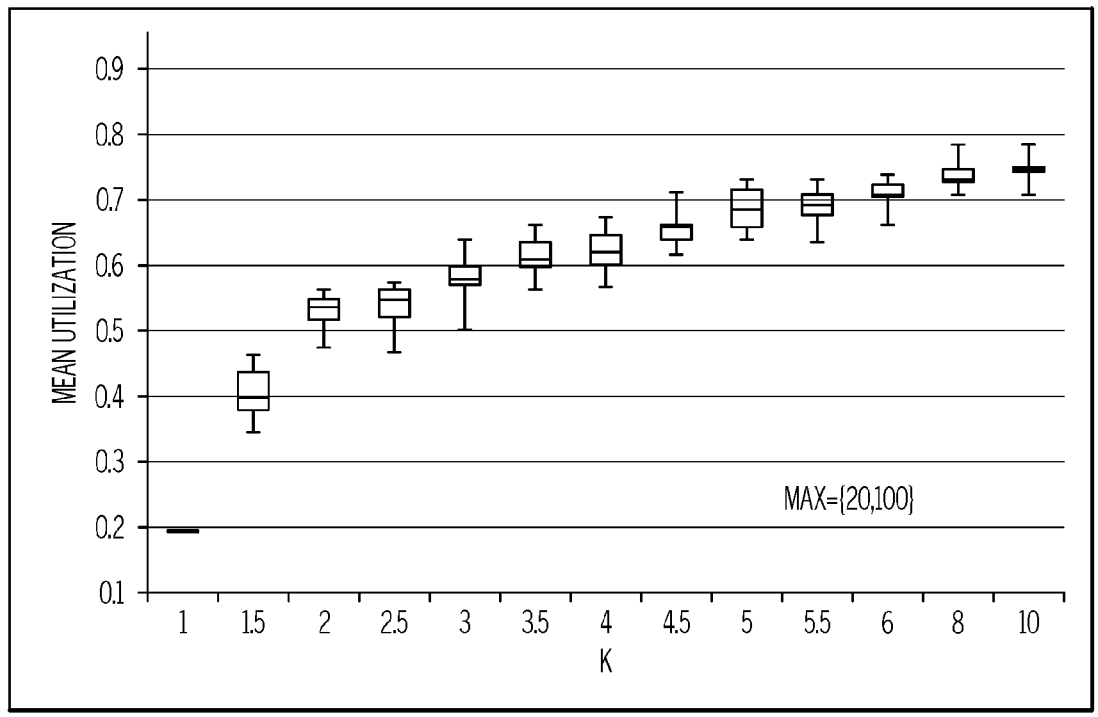

In order to compare the performances of parameter-based policies $\mathbb{P}_1$ and $\mathbb{P}_2$ in terms of utilization we vary tunable parameters and observe the behavior of mean utilization. For $\mathbb{P}_1(\kappa, D_k{}^{max})$, we varied $\kappa$ from 1 to 10 with increments of 0.5 for three different $D_{max}$ values: $\{4,20\}$, $\{8,40\}$, $\{20,100\}$, where each tuple represents the value of $D_{max}$ for small and large VMs, respectively. We obtained the rejection rates from the simulator and calculated the mean utilization using (16). As depicted in FIG. 2(a), (b), (c) we observe an increase in mean utilization with the increase in the commitment factor, for all maximum demand values. Further, we observe that for the same commitment factor $\kappa$, as the $D_{CPU}{}^{max}$ decreases, utilization increases since smaller $D_{CPU}{}^{max}$ values admit more thus the policy rejects less number of requests. FIG. 2 is a utilization in policy ($\mathbb{P}_1$) as a function of commitment factor $\kappa$. More specifically, FIG. 2(a) illustrates $D_{CPU}{}^{max}=\{4,20\}$, FIG. 2(b) is $D_{CPU}{}^{max}=\{8,40\}$, and FIG. 2(c) $D_{CPU}{}^{max}=\{20,100\}$.

For $\mathbb{P}_2(\theta, \mu_{D_k})$, we varied $\theta$ in the range of [0.5,1] with increments of 0.05 for the mean demand of $\{2,10\}$. The mean utilization as a function of $\theta$ is depicted in FIG. 2. We observe that an increment in $\theta$ value allows the admission controller to accept more requests, thus increasing the mean utilization. For a utilization in policy ($\mathbb{P}_2$) as a function of $\theta$ refer to FIG. 3.

Figure 3:
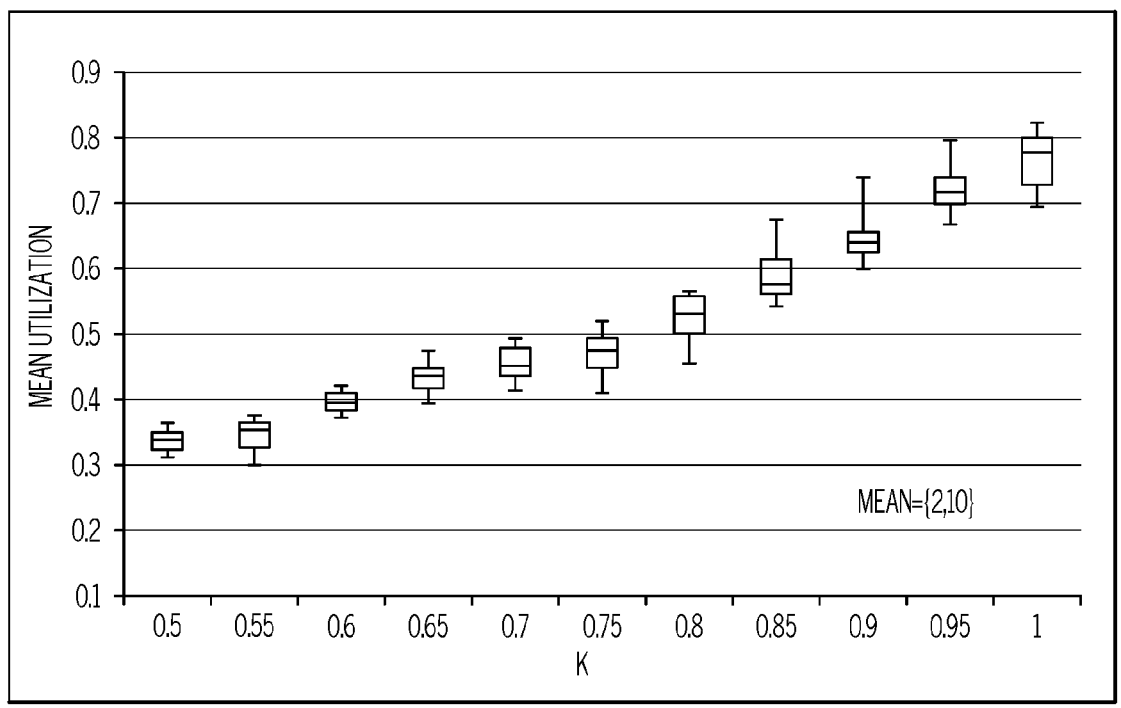
FIG. 3 is a graph of a utilization in policy ($\mathbb{P}_2$) as a function of θ.

FIG. 2 and FIG. 3 show the corresponding resource utilization for selected policy parameters and provide a benchmark for Cloud administrators to select parameter values for the desired utilization values. As an example, when $D_{CPU}{}^{max}$ is $\{4,20\}$ for different VM types, the average utilization is limited to 0.90 if $\kappa=8$ is chosen as seen in FIG. 2 for the 95% average load in Policy 1. Similarly, the corresponding $\theta$ value for the desired average utilization for Policy 2 is found from FIG. 3.

$\mathbb{P}_3$, on the other hand, is not parameter-based and it ensures the given quality-of-service and keeps the utilization below the desired level based on the measured resource utilization statistics.

4.3 Effect of Demand Variation on Probability of Over-Utilization

In $\mathbb{P}_1$ and $\mathbb{P}_2$, resource demand variations are not taken into account in selecting the policy parameters. In this section, we investigate the impact of variation in CPU demand on probability of over-utilization with respect to fixed parameters of $\mathbb{P}_1$ and $\mathbb{P}_2$.

Figure 4A:
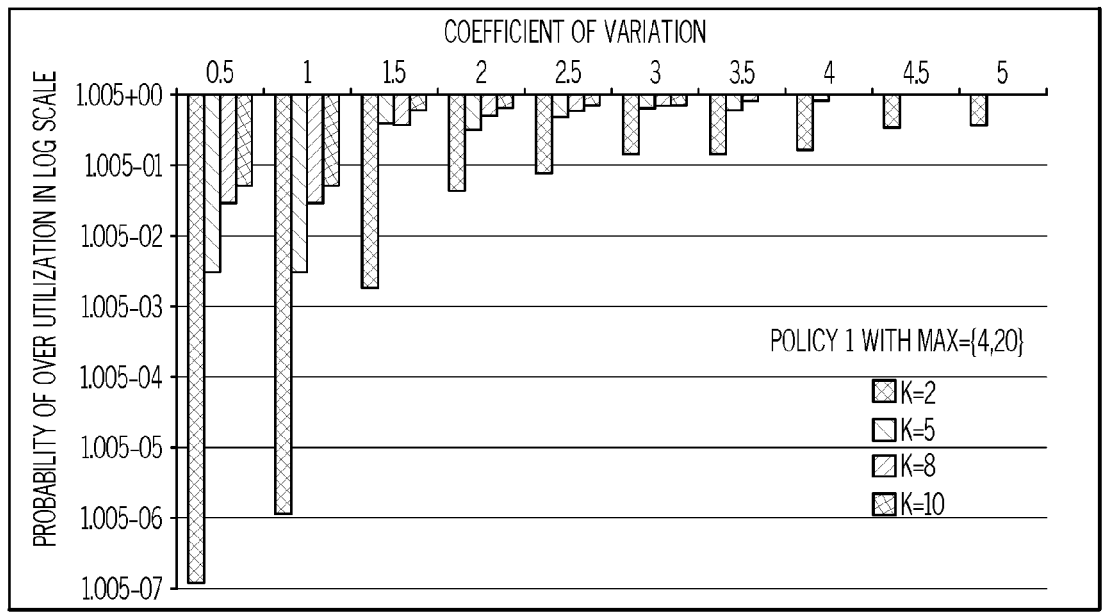
FIG. 4(a), FIG. 4(b), and FIG. 4(c) are a series of graphs illustrating probability of over-utilization in policy ($\mathbb{P}_1$), $P(U_{CPU} \geq 0.95)$, as a function of the coefficient of variation.
Figure 4B:
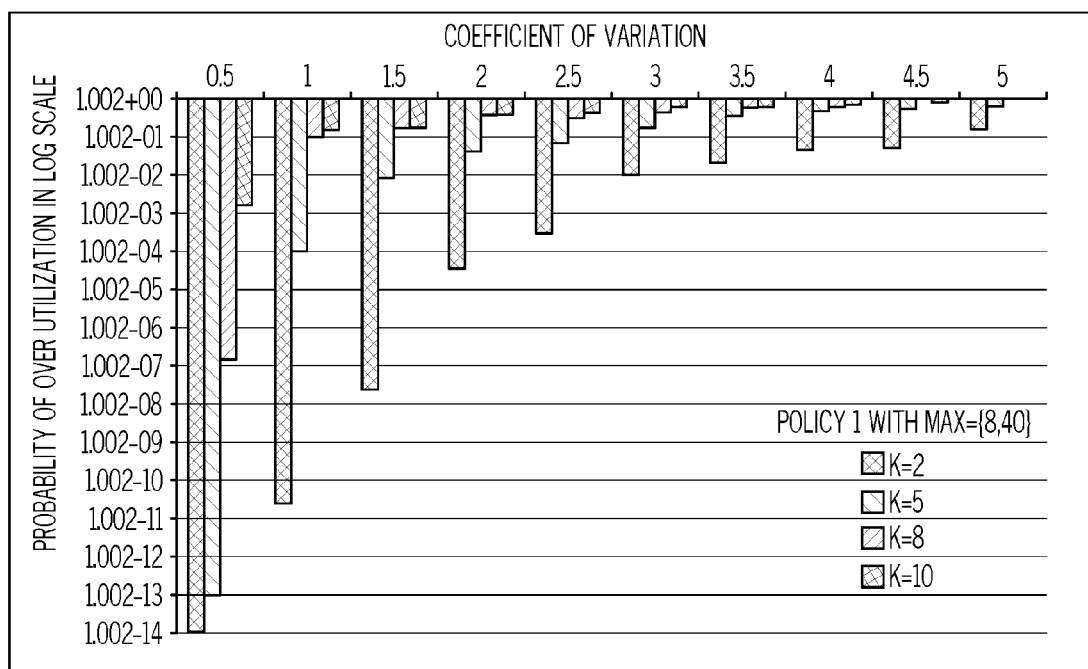
Figure 4C:
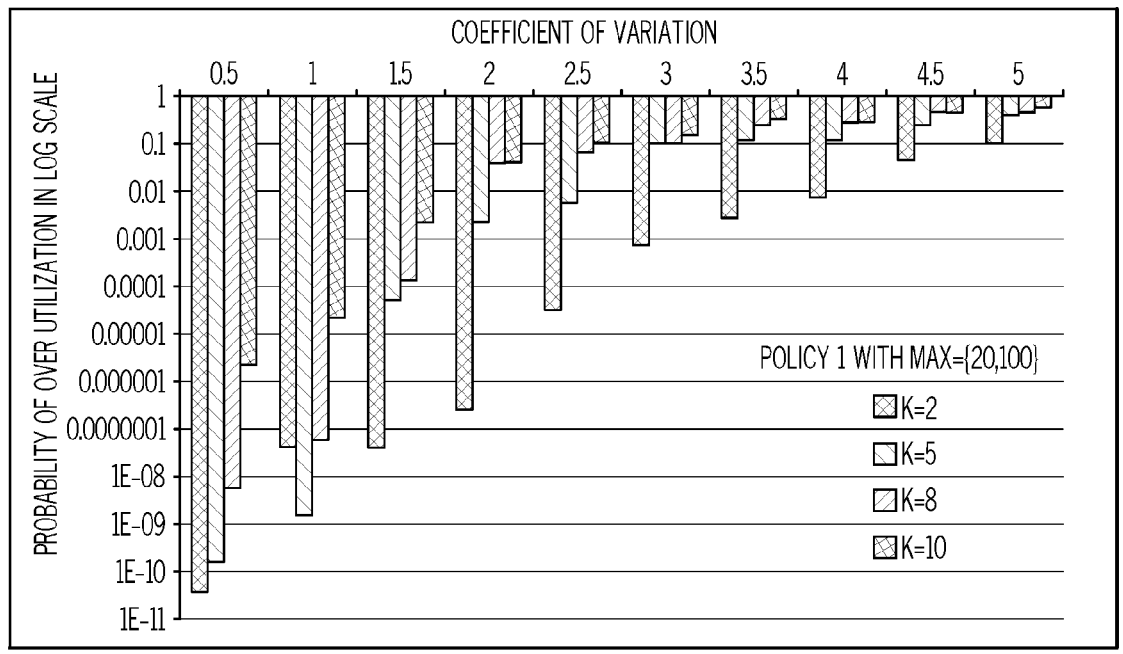

For $\mathbb{P}_1$, we fixed the commitment factor, $\kappa$, to $\{2,5,8,10\}$ for various levels of fixed $D_{CPU}{}^{max}$: $\{4,20\}$, $\{8,40\}$, $\{20,100\}$ values. We obtained the average number of accepted requests from the simulator and calculated the convoluted probability distribution function as described in section 2. FIG. 4(a), (b), (c) depicts that for all $\kappa$ and $D_{CPU}{}^{max}$ values, as the coefficient of variation increases, the probability of over-utilization increases due to increase in the uncertainty. (FIG. 4 is a graph illustrating probability of over-utilization in policy ($\mathbb{P}_1$), $P(U_{CPU} \geq 0.95)$, as a function of the coefficient of variation in logarithmic scale.) For the same $\kappa$ values, higher $D_{CPU}{}^{max}$ values result in rejecting more requests thus yielding less over-utilization probability. For instance, the probability of over-utilization for the same coefficient of variation is less in FIG. 4(c) than FIG. 4(a). Moreover, when the coefficient of variation increases for fixed $D_{CPU}{}^{max}$ values (any $D_{CPU}{}^{max}$), $\kappa$ values need to be decreased to reduce the chance of over-utilization. This experiment clearly indicates that the impact of demand variations can be fenced by selecting appropriate κ values in $\mathbb{P}_1$ and likelihood of higher-utilization is reduced.

Figure 5:
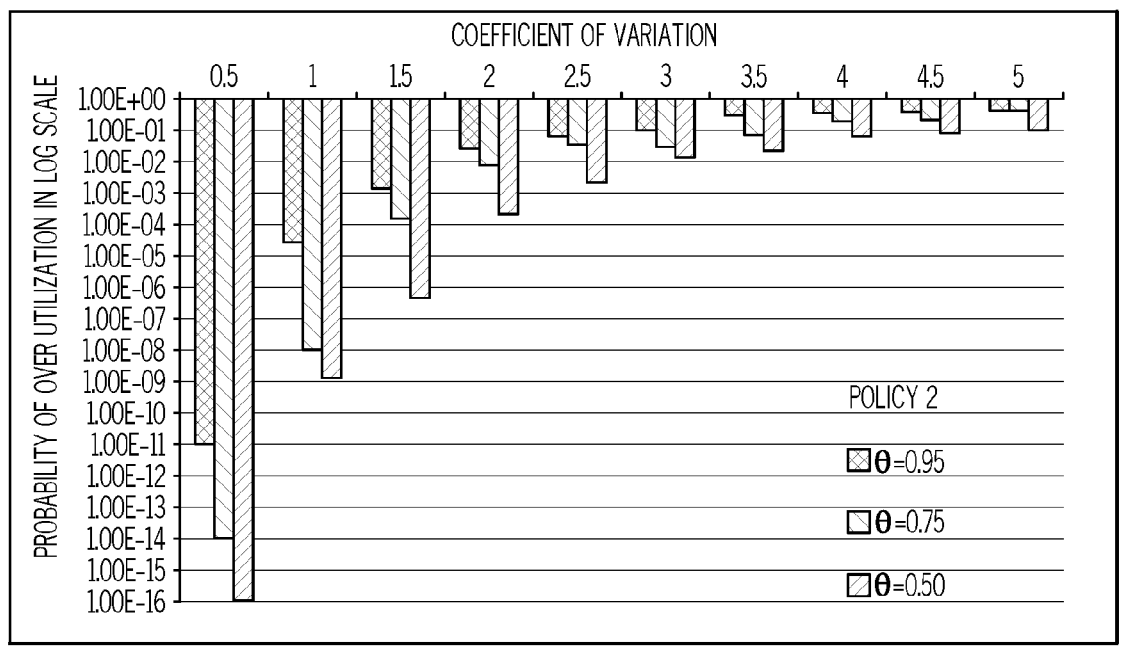
FIG. 5 is a graph of a probability of over-utilization in policy ($\mathbb{P}_2$) as coefficient of variation increases.

Similarly, in $\mathbb{P}_2$, as the coefficient of demand variation increases, the probability of over-utilization increases regardless of the commitment factor, θ. FIG. 5 also shows that for higher θ values, the probability of over-utilization is higher. (FIG. 5 is a graph of the probability of over-utilization in policy ($\mathbb{P}_2$) as coefficient of variation increases in logarithmic). When the coefficient of variation increases, θ values need to be decreased in order to reduce the probability of over-utilization. Thus, in order to limit the probability of over-utilization below a threshold, ε for $\mathbb{P}_2$, the commitment factor, θ, needs to be tuned accordingly.

Figure 6:
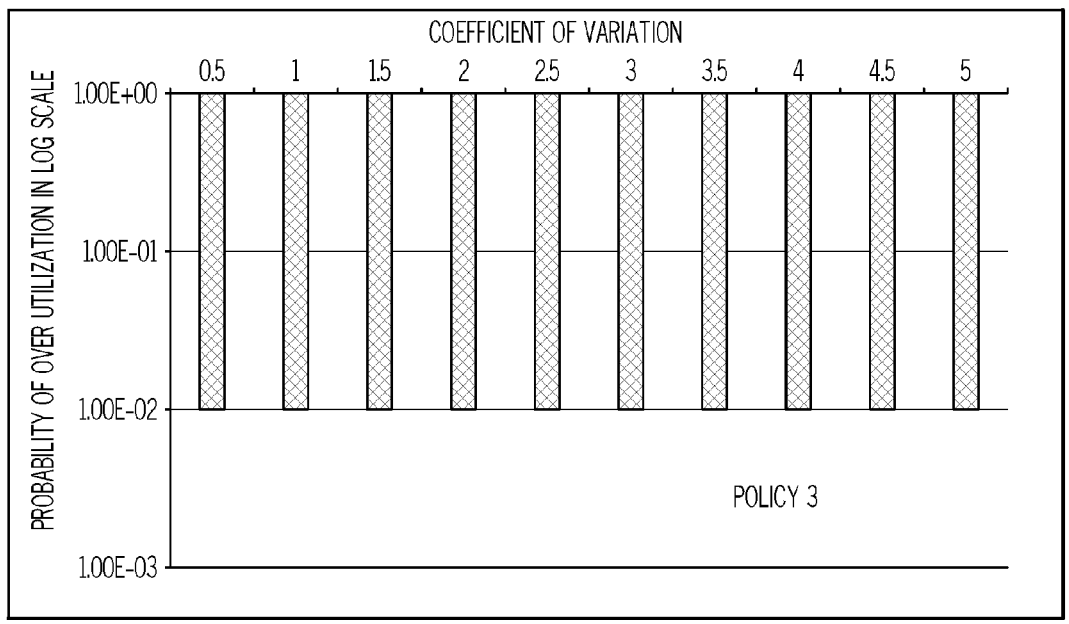
FIG. 6 is a graph illustrating that over-utilization probability in $\mathbb{P}_3$ is independent from demand variations.

Since $\mathbb{P}_3$ is a measurement-based policy, it always ensures that the probability of over-utilization is under ε, which is 0.01 for this specific example, regardless of changes in coefficient of variation. FIG. 6 illustrates that over-utilization probability in $\mathbb{P}_3$ does not depend on demand variations. Stated differently, FIG. 6 is a graph illustrating a probability of over-utilization in policy ($\mathbb{P}_3$) as coefficient of variation increases.

Unlike $\mathbb{P}_1$ and $\mathbb{P}_2$, $\mathbb{P}_3$ monitors the system and makes the acceptance decision based on the state of the Cloud in terms of over-utilization probability. Not only it ensures the stability of the Cloud but also it can be used to tune the parameters of $\mathbb{P}_1$ and $\mathbb{P}_2$ to keep the over-utilization probability under ε threshold. The relationship between $\mathbb{P}_3$ and other policies is described in the next section.

4.4 Relationship Between Policies

Figure 7:
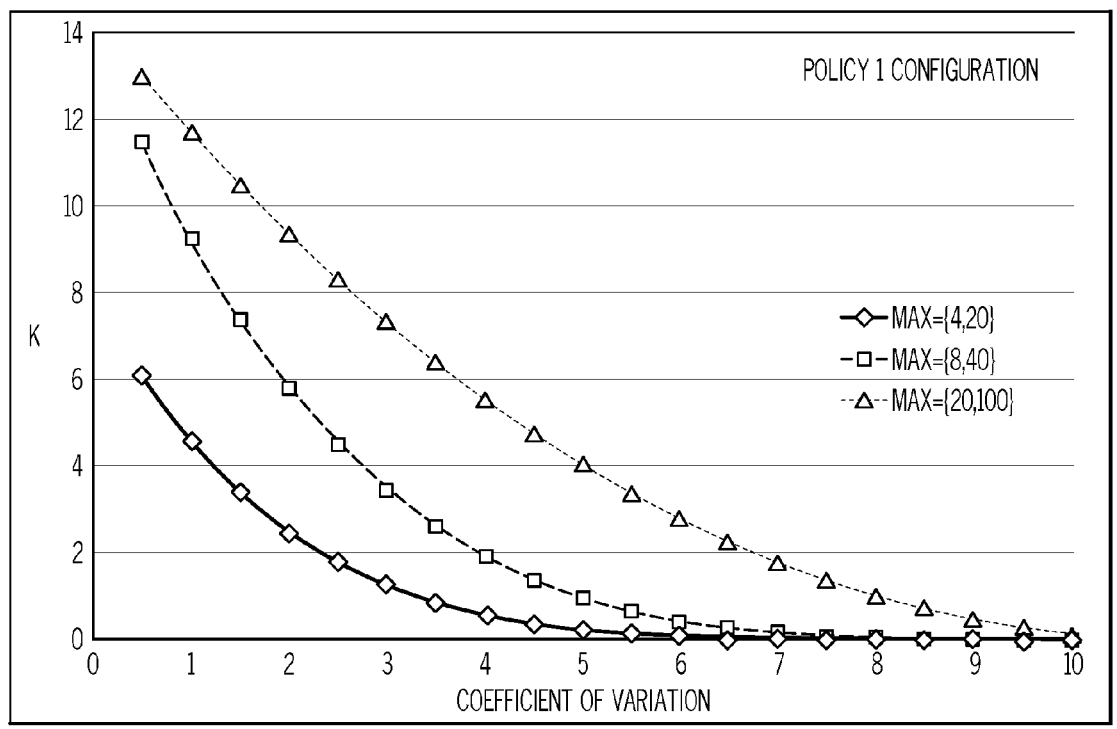
FIG. 7 is a graph illustrating the relationship between the commitment factor, κ, and the coefficient of variation for different $D_{CPU}^{max}$ values for $\mathbb{P}_1$.

As previous experiments indicate, admissions with $\mathbb{P}_1$ and $\mathbb{P}_2$ with fixed parameters will under-perform as the coefficient of variation of demand changes, whereas $\mathbb{P}_3$ always ensures the required quality-of-service for the Cloud. The commitment factor, κ, for $\mathbb{P}_1$ and θ for $\mathbb{P}_2$ need to be adjusted as the variation in the CPU demand changes in order to maintain the quality-of-service on over-utilization. One can use the probability of over-utilization function for $\mathbb{P}_3$ to adjust the parameters of the other two policies. We obtained the average number of accepted requests by $\mathbb{P}_3$ from the simulator and used (??) to obtain various κ values for different levels of variations. FIG. 7 shows the relationship between the commitment factor, κ, and the coefficient of variation for different $D_{CPU}^{max}$ values for $\mathbb{P}_1$. Stated differently, FIG. 7 is a graph illustrating maintaining ($\mathbb{P}_3$) utilization in ($\mathbb{P}_1$) by tuning commitment factor. We note that the probability of over-utilization is kept under ε in $\mathbb{P}_1$ by employing the same number of concurrent requests allowed $N_{max}(\mathbb{P}_3)$ that we found for $\mathbb{P}_3$ in $\mathbb{P}_1$. For instance, by employing this approach, as the coefficient of variation increases from 0.5 to 2.5 for $D_{CPU}^{max}=\{4,20\}$, κ value needs to be dropped from 6 to 2 in order to keep the probability of over-utilization under 0.01. The relationship between κ and the coefficient of variation follows an exponential behavior, and as $D_{CPU}^{max}$ values increases, the degree of the exponent decreases.

Figure 8:
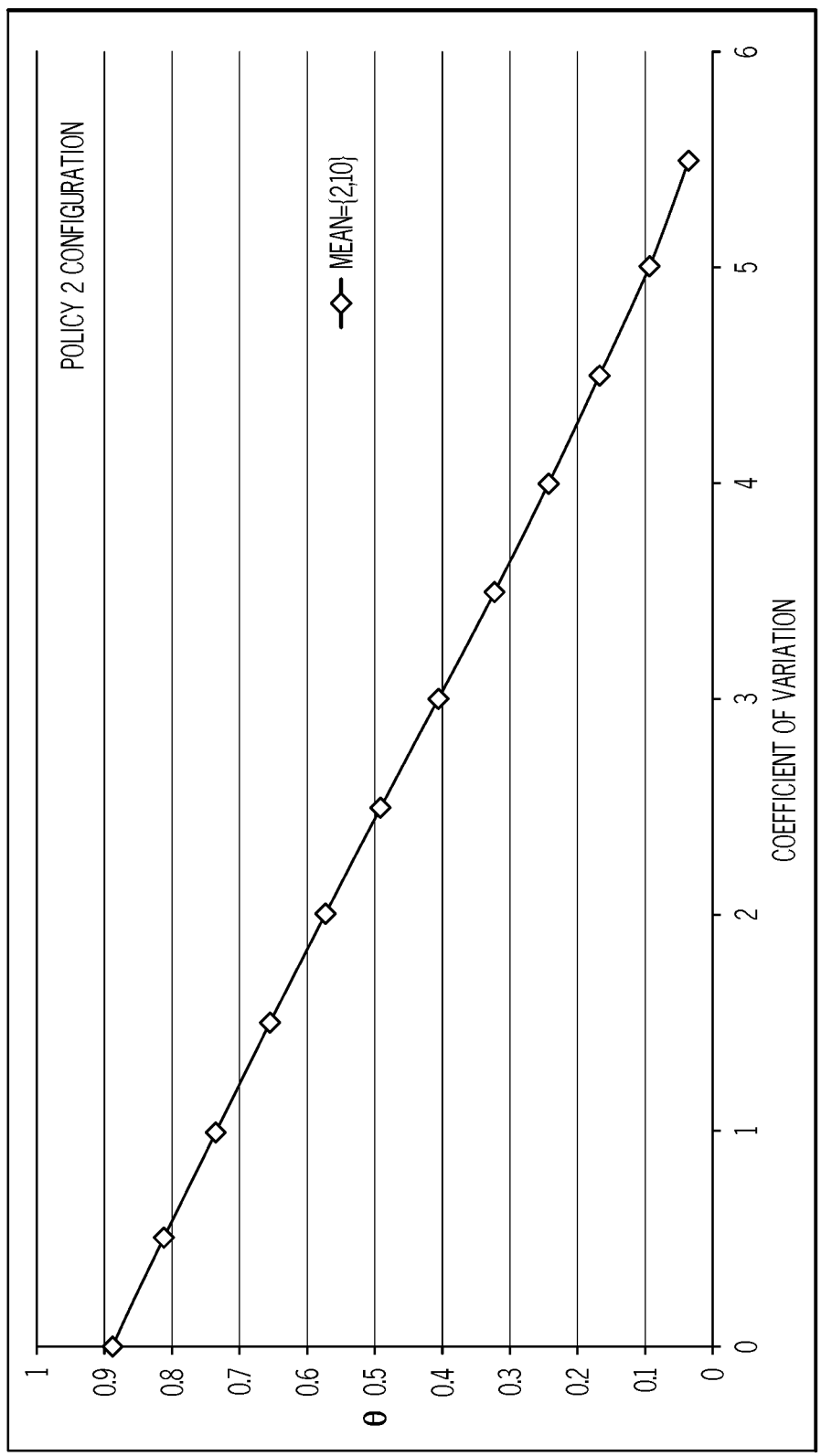
FIG. 8 is a graph illustrating the relationship between θ and the coefficient of variation for $\mathbb{P}_2$.

Similarly, admissions under $\mathbb{P}_2$ is not responsive to changes in coefficient of variation unless the commitment factor, θ, is adjusted. FIG. 8 shows the relationship between θ and the coefficient of variation for $\mathbb{P}_2$. FIG. 8 illustrates maintaining ($\mathbb{P}_3$) utilization in ($\mathbb{P}_2$) by tuning commitment factor. We note that $\mathbb{P}_2$ maintains the probability of over-utilization under ε by again using the probability of over-utilization function of $\mathbb{P}_3$. There is almost a linear relationship between these two attributes for μ={2,10}. For instance, when the coefficient of variation increases from 2 to 4, θ value needs to be dropped from 0.6 to 0.25.

5.0 Choice of Beta Distribution

Figure 9A:
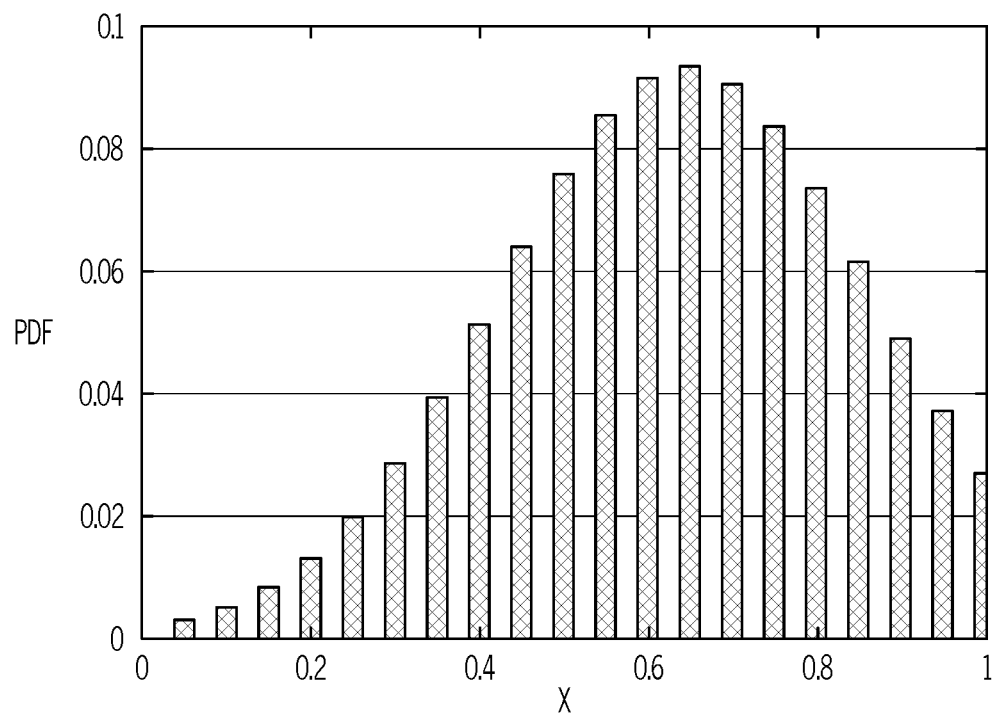
FIG. 9(a) is a graph a in [0,1], which maximizes entropy.
Figure 9B:
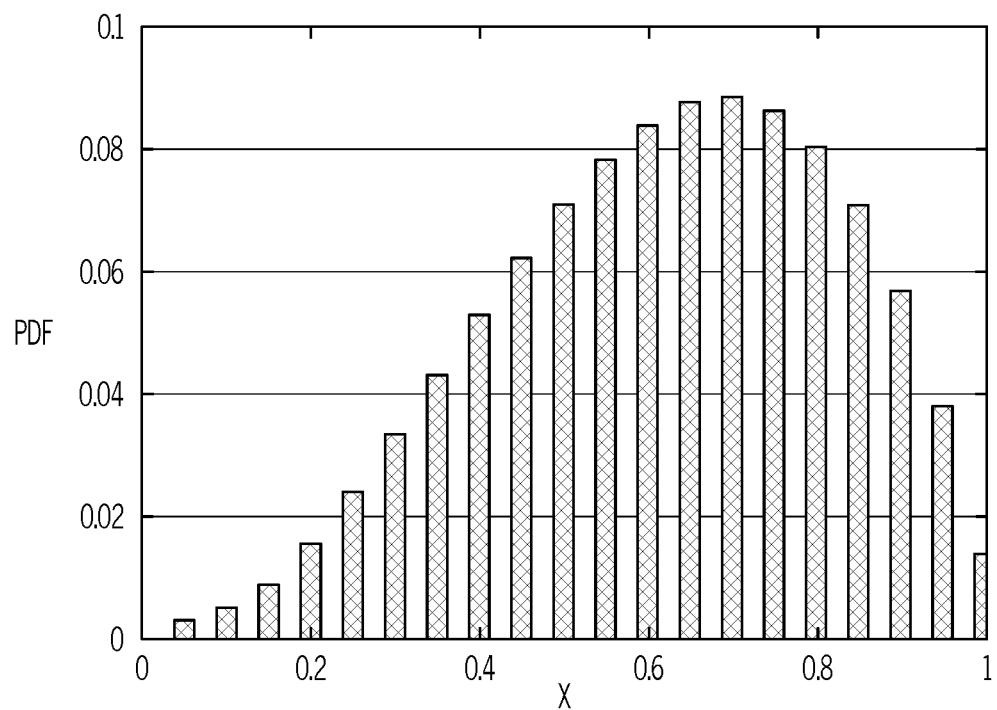
FIG. 9(b) is a graph of the corresponding Beta distribution of FIG. 9(b)

We select a probability distribution for the utilization of resource k, $U_k$, from the first and second moments of the distribution. In general, when given the first few moments of a probability distribution, the most likely distribution function is the one that maximizes entropy. As an example, given a mean of 0.6 and a standard deviation of 0.2 for a distribution in [0,1], we plot the distribution which maximizes entropy in FIG. 9(a). Matching the first and second moments, we plot the corresponding Beta distribution in FIG. 9(b). As noted, the Beta distribution approximates well the maximum entropy distribution.

6.0 Parameters of the Beta Distribution

Beta distribution is a family of continuous probability distributions defined on the interval [0,1] by two positive parameters, denoted by α and β with following probability density function:

$$f(x; \alpha, \beta) = \frac{x^{\alpha-1}(1-x)^{\beta-1}}{B(\alpha, \beta)} \qquad (17)$$

where B is the beta function. Hence, we also characterize the utilization x with two parameters, α and β, associated with the first and second moments of x. First moment of the beta distribution: Using the method of moments estimator, the sample mean $\bar{R}$ and the variance $\bar{S}^2$ of the observed utilization are set to the population mean and the variance and expressed in terms of the mean and the standard deviation of the associated beta distribution as:

$$\bar{R} = \frac{\alpha}{\alpha + \beta} \qquad (18)$$

$$\bar{S}^2 = \frac{\alpha\beta}{(\alpha + \beta + 1)(\alpha + \beta)^2} \qquad (19)$$

From (18) and (19), α and β are solved in terms of population mean and variance as:

$$\alpha = \bar{R}\left(\frac{\bar{R}(1-\bar{R})}{\bar{S}^2} - 1\right) \qquad (20)$$

$$\beta = (1-\bar{R})\left(\frac{\bar{R}(1-\bar{R})}{\bar{S}^2} - 1\right) \qquad (21)$$

For the estimated α and β values, the cumulative distribution function can be expressed in terms of incomplete beta function F(x;α,β) as:

$$F(x; \alpha, \beta) = \frac{B(x; \alpha, \beta)}{B(\alpha, \beta)} = I_x(\alpha, \beta) \qquad (22)$$

Here, (22) gives the $x^{th}$ percentile of the beta distribution. As an example, the $90^{th}$ percentile of the resource utilization is expressed as $F(0.9,\alpha,\beta)=I_{0.9}(\alpha,\beta)$ which is the probability that the utilization is below 90%.

7.0 Adding a VM

The impact of a virtual machine to a physical machine can be measured by how much the likelihood of exceeding the over-utilization threshold is increased. If $\mu$ and $\sigma$ are the first and second moments of the utilization demand, respectively, on resource $R_k$ by the new arrival, then the new mean and variance value for resource utilization after the arrival is found as:

$$\bar{R}'=\bar{R}+\mu \quad (23)$$

$$\bar{S}^{2'}=\bar{S}^2+\sigma^2 \quad (24)$$

Here, we assume that the utilization demand of the newly arriving VM is independent of the utilization of the physical machine. The probability density function for the new utilization is characterized by $\alpha'$ and $\beta'$ values associated with the new mean and variance values. If the contribution of a virtual machine to the first and second moments of a resource changes the $\alpha$ and $\beta$ values to $\alpha'$ and $\beta'$, then the increase in the 90$^{th}$ percentile due to this particular virtual machine is found as: $I_{0.9}(\alpha,\beta)-I_{0.9}(\alpha',\beta')$. As an example if the newly presented virtual machine reduces the 90% percentile of the utilization from $I_{0.9}(\alpha,\beta)=0.25$ to $I_{0.9}(\alpha',\beta;)=0.20$, then it is 5% more likely that the resource utilization will go over 90% utilization with the new arrival. This is the impact of a virtual machine on a physical machine.

8.0 Distribution of the Number of Requests Accommodated in the Cloud

Given an $N_{max}$ we can evaluate the stationary distribution of the number of requests in the system by noting that the equivalent model is that of an M/G/m/m loss queuing system, where $m=|PM| \times N_{max}$. In particular, in the case of exponentially distributed lifetimes, we have an M/M/m/m loss queue whose stationary distribution is given by $$\pi_n = \pi_0 \frac{(\lambda \tau)^n}{n!}, n = 1, 2, \ldots, m, \quad (25)$$

and $\pi_0$ is given by the normalizing constant $$\pi_0 = \left[\sum_{n=0}^{m} \frac{(\lambda \tau)^n}{n!}\right]^{-1} \quad (26)$$

The average occupancy is given by $$\bar{N}=\Sigma_{n=0}^{m} n\pi_n. \quad (27)$$

Thus, given $N_{max}$, we have the average utilization of resource k as:

$$\overline{U_k} = \frac{\bar{N}\mu_{D_k}}{C_k|PM|} \quad (28)$$

and the rejection probability $$\delta=\pi_{N_{max}}. \quad (29)$$

Define an overload factor $\eta(U_k^*)=Pr[U_k>U^*]$. Since $U_k=N\ D_k$, then by conditioning on N we get $$\eta_k(U_k^*) = \sum_{n=1}^{N_{max}} \pi_n Pr[U_k > U_k^* | n] = \sum_{n=1}^{N_{max}} \pi_n \left(1 - F_{Z_k^n}(U_k^* | n)\right). \quad (30)$$

8.0 System D

9.0 Example Flow Charts

Figure 10:
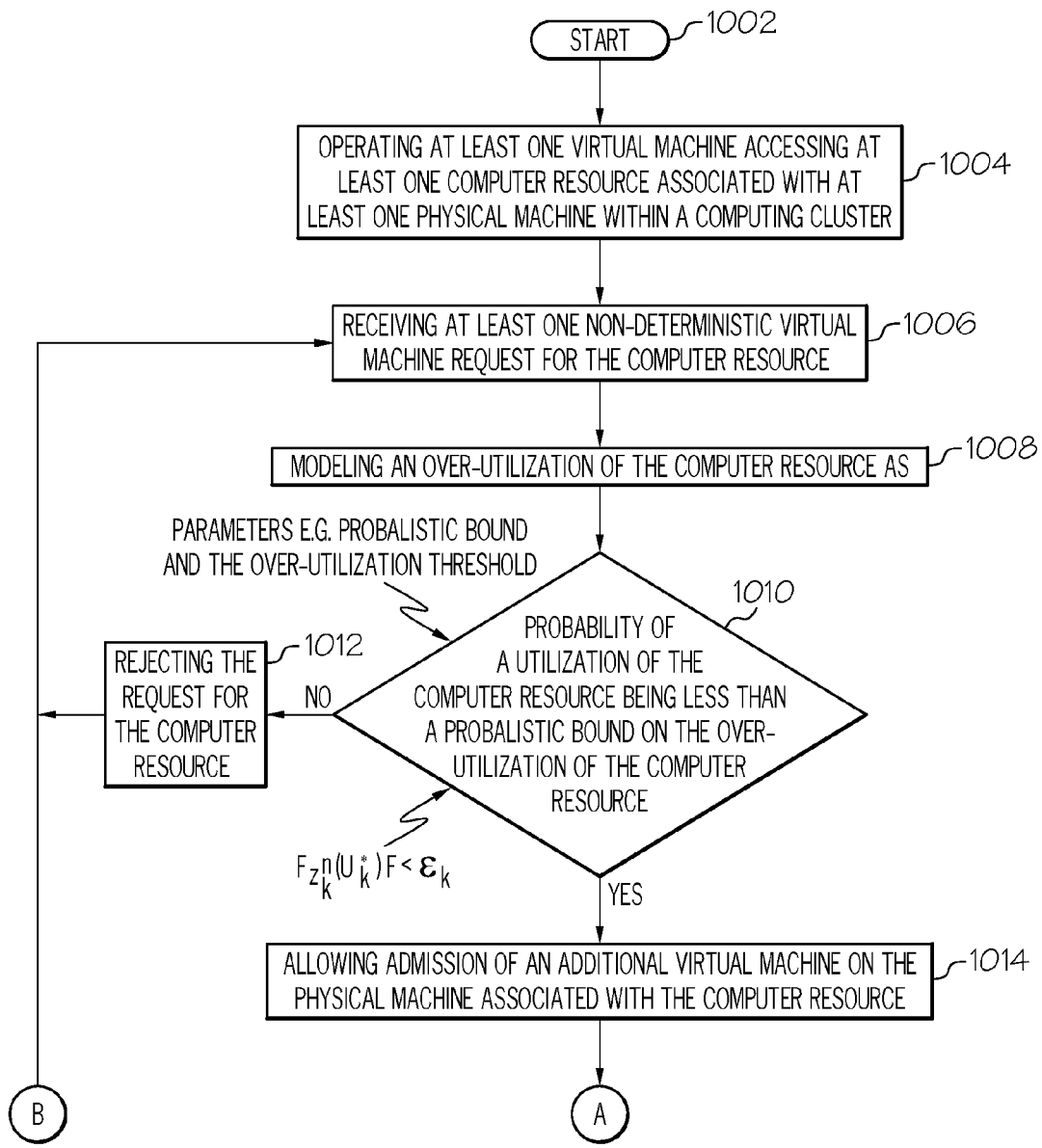
FIG. 10 and FIG. 11 are a flow chart of managing requests for an additional virtual machine.
Figure 11:
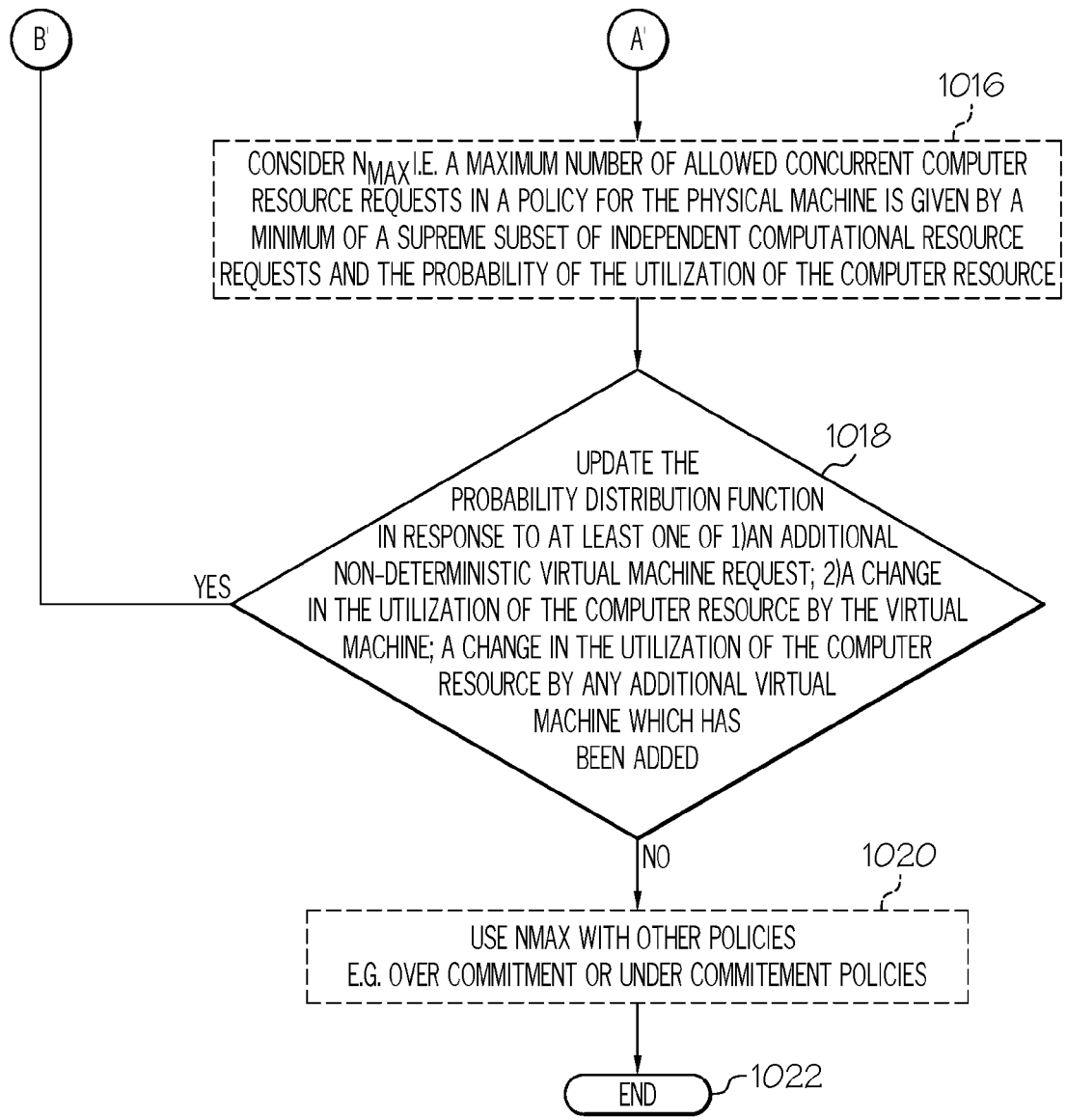

FIG. 10 and FIG. 11 are an example flow chart of managing requests for an additional virtual machine. The process begins in step 1002 and immediately proceeds to step 1004 where a cluster or cloud system includes at least one virtual machine accessing at least one computer resource associated with at least one physical machine. In step 1006, one or more non-deterministic virtual machine request for the computer resource are received. An over-utilization of the computer resource as a probability distribution function is modeled in step 1008. For example equation 8 above re-written as $F_{Z_k^n}(U_k^*)<\epsilon_k$. Based on a probability of a utilization of the computer resource being greater than a probalistic bound on the over-utilization of the computer resource, allowing admission of an additional virtual machine on the physical machine associated with the computer resource, steps 1010 and 1014. Otherwise, the request for the computer resource is rejected in step 1012 and the process continues bask to step 1006 or the flow terminates (not shown). In step 1014, the admission of an additional virtual machine on the physical machine associated with the computer resource is allowed.

An optional step 1016, shown in broken lines may be used to calculate $N_{max}$. wherein the maximum number of allowed concurrent computer resource requests $N_{max}$ in a policy is given by $$N_{max} = \min_{k \in K}\{\sup\{n \mid F_{Z_k^n}(U_k^*) \ge (1 - \varepsilon_k)\}\},$$

where sup is a supremum subset and n is a sum of independent k$^{th}$ computer resource request. The supremum (sup) of a subset S of a totally or partially ordered set T is the least element of T that is greater than or equal to all elements of S. In our description it is the n$^{th}$ virtual machine that violates the acceptance condition for Policy 3 above. That is a condition is the probability of overutilization is above the epsilon for the first time. For example, assume k=1 and let's say we accepted 5 VMs so far without violating the condition and our condition is still valid. When the 6th VM comes, the condition is violated. The $N_{max}$ is 6 for this specific example. Any number of Vm's greater than 6 is going to violate the over utilization probability condition for that one resource.

The maximum allowed VMs on a PM for one resource is given by Section 3.0 above $\{\sup\{n|F_{Z_k^n}(U_k^*) \ge (1-\epsilon_k)\}\}$.

This may be used to limit the addition of new virtual machines or in conjunction with other policies e.g. maximum number of allowed concurrent computer resource requests in a policy for the physical machine is given by a minimum of a supreme subset of independent computational resource requests and the probability of the utilization of the computer resource.

Since we also capture more than one resource type, we calculate (1) for each resource type (we have k resource types) and pick the minimum of all since the minimum of them will be the bottleneck resource that determines the $N_{max}(\mathbb{P}_3) = \min_K \{\sup\{n | F_{Z_k^n}(U_k^*) \geq (1-\epsilon_k)\}\}$.

The dynamic aspect of updating the probability distribution function is shown in step 1018. For example in response to at least one of 1) an additional non-deterministic virtual machine request; 2) a change in the utilization of the computer resource by the virtual machine; 3) a change in the utilization of the computer resource by any additional virtual machine which has been added, the process continues to loop back to step 1006.

In another optional step, $N_{max}$ can then be used with either an over-commitment placement polity or a under commitment placement policy or both in step 1020. The process end in step 1022.

10.0 Other Techniques

The problem of admission control in data centers, and in the Cloud in general, has been addressed from different angles. In a data center that is subjected to a stream of VM requests of different types is considered. Due to the large size of the problem, an approximate dynamic programming technique is proposed. The allocation of VMs on PMs is performed assuming a fixed demand of resources. But, in practice, the demand varies over time, suggesting the inclusion of the variability in demand when admitting a VM. This variability in CPU usage enabled the overbooking of resources.

In the area of task allocation in distributed systems, the variability in resource demand has also been addressed. In a genetic algorithm is employed to dynamically schedule heterogeneous tasks on heterogeneous processors. A different approach is proposed in that is based on annealing models and simulated annealing.

Fundamentally, admission control is similar in many ways to loss systems. In such systems, a collection of resources with some capacities are provided to a stream of requests, where each request specifies its resource demand. Typically, the resource demand is fixed. Even in this case, and given Poisson arrivals of requests and generally distributed request residence times, the probabilistic analysis, say to evaluate the loss probability, which corresponds to the rejection rate in admission control, is challenging due to the need to compute a normalizing constant. To overcome this challenge, asymptotic approximations have been obtained for load factors that correspond to light, critical, and overload conditions.

Back to the Cloud computing environment, there the variability in demand depends on the nature of the resource. For example, for the CPU resource on a PM, the total CPU demand of all VMs hosted on that CPU may very well exceed 100%. This will simply result in congestion and degraded performance. However, for the memory resource, such an overload is unacceptable since it may lead to crashing. Hence, a method for estimating the probability of overload is crucial in deciding on admitting a VM into the system. And, that is exactly one of the novelties of the present invention.

12.0 Generalized Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 12:
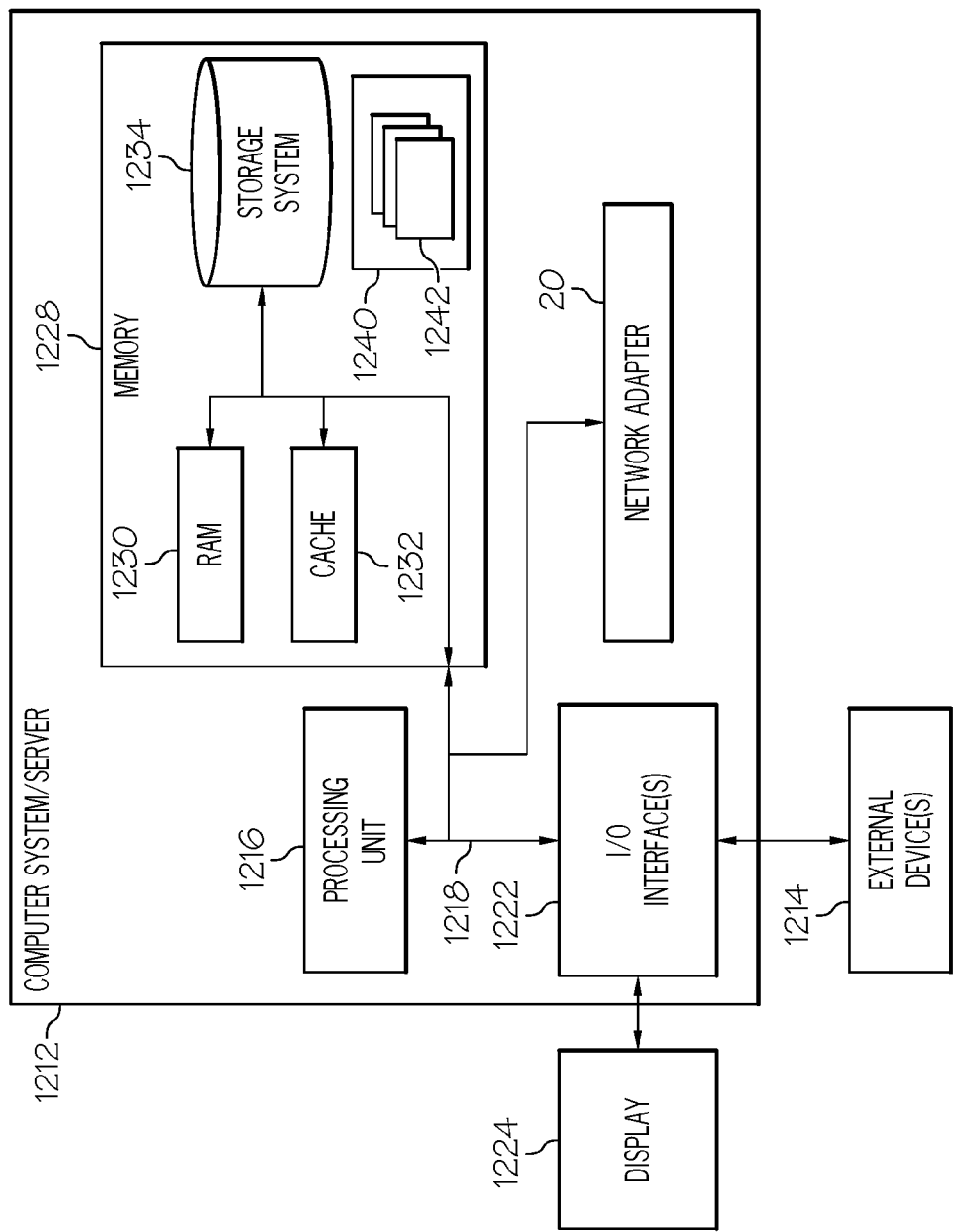
FIG. 12 is a diagram illustrating an example cloud computing system or node.

Referring now to FIG. 12, a schematic of an example of a cloud computing node is shown. Cloud computing node 1210 is only one example of a suitable cloud computing node and is not intended to suggest any limitation as to the scope of use or functionality of embodiments of the invention described herein. Regardless, cloud computing node 1210 is capable of being implemented and/or performing any of the functionality set forth hereinabove.

In cloud computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in cloud computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1212 typically includes a variety of computer system readable media. Such media may be any available media that is accessible by computer system/server 1212, and it includes both volatile and non-volatile media, removable and non-removable media.

System memory 1228 can include computer system readable media in the form of volatile memory, such as random access memory (RAM) 1230 and/or cache memory 1232. Computer system/server 1212 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, memory 1228 may include at least one program product having a set (e.g., at least one) of program modules that are configured to carry out the functions of embodiments of the invention.

Program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein. Computer system/server 1212 may also communicate with one or more external devices 14 such as a keyboard, a pointing device, a display 1224, etc.; one or more devices that enable a user to interact with computer system/server 1212; and/or any devices (e.g., network card, modem, etc.) that enable computer system/server 1212 to communicate with one or more other computing devices. Such communication can occur via Input/Output (I/O) interfaces 22. Still yet, computer system/server 1212 can communicate with one or more networks such as a local area network (LAN), a general wide area network (WAN), and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples, include, but are not limited to: microcode, device drivers, redundant processing units, external disk drive arrays, RAID systems, tape drives, and data archival storage systems, etc.

Figure 13:
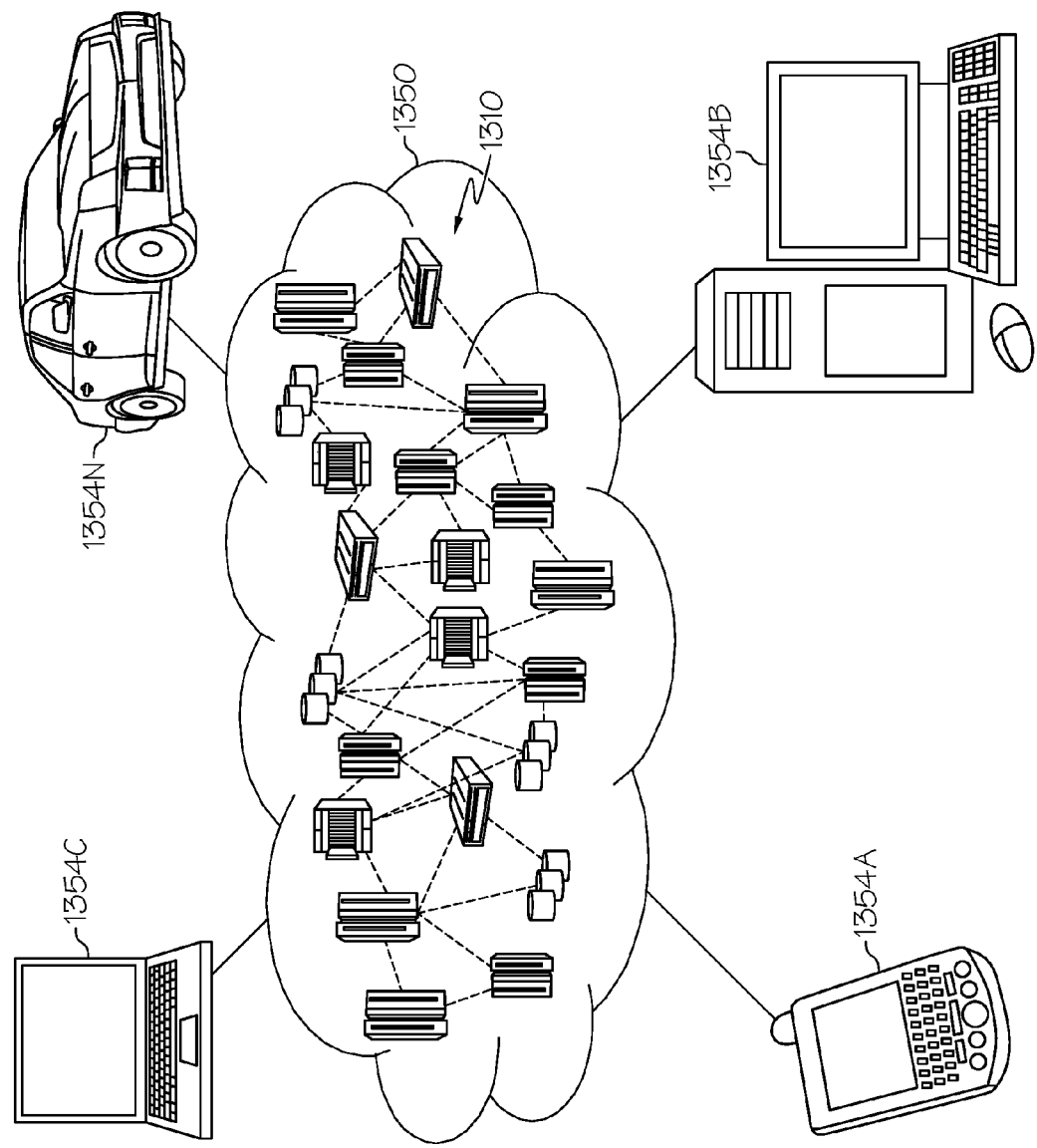
FIG. 13 is a diagram illustrating an example cloud computing environment with FIG. 12.

Referring now to FIG. 13, illustrative cloud computing environment 1350 is depicted. As shown, cloud computing environment 1350 comprises one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 10 and cloud computing environment 1350 can communicate with any type of computerized device over any type of network and/or network addressable connection (e.g., using a web browser).

Figure 14:
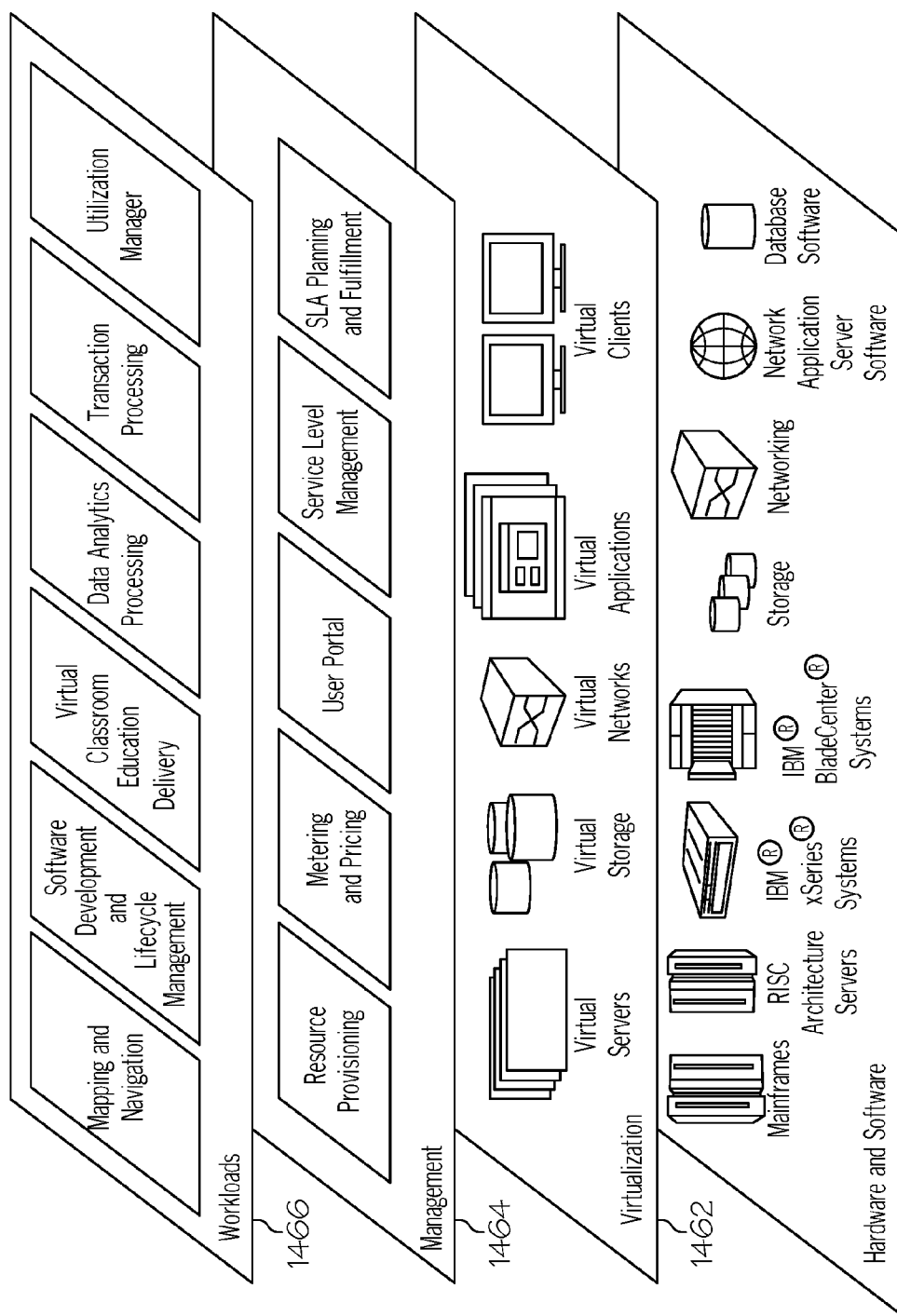
FIG. 14 is a diagram of an example abstraction model layers in a cloud computing environment of FIG. 13.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1462 provides an abstraction layer from which the following examples of virtual entities may be provided: virtual servers; virtual storage; virtual networks, including virtual private networks; virtual applications and operating systems; and virtual clients.

In one example, management layer 1364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1466 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the software or algorithm for managing the utilization of the resources in the cloud in accordance with the feature invention.

13.0 Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for managing requests for an additional virtual machine, the system comprising:
   a memory;
   a processor communicatively coupled to the memory, where the processor is configured to perform
   operating at least one virtual machine accessing at least one computer resource associated with at least one physical machine within a computing cluster;
   receiving at least one non-deterministic virtual machine request for the computer resource;
   determining a maximum number of allowed concurrent computer resource requests in a policy for the physical machine is given by a minimum of a supreme subset of independent computational resource requests and a probability of a utilization of the computer resource, wherein the maximum number of allowed concurrent computer resource requests $N_{max}$ in a policy is given by $$N_{max} = \min_{k \in K}\{\sup\{n \mid F_{Z_k^n}(U_k^*) \geq (1-\varepsilon_k)\}\},$$

where sup is a supremum subset and n is a sum of independent $k^{th}$ computer resource request; and
   based on the probability of the utilization of the computer resource being less than a probabilistic bound on an over-utilization of the computer resource, allowing admission of an additional virtual machine on the physical machine associated with the computer resource, otherwise, rejecting the request for the computer resource.

2. The system of claim 1, wherein the probability of the utilization of the computer resource is less than an over-utilization threshold $U_k^*$ is given by $$F_{Z_k^n}(U_k^*) \leq \varepsilon_k$$

where the computer resource k associated with the physical machine, the probabilistic bound is $\varepsilon_k$, and $F_{Z_k^n}$ is a function of a sum of n independent $k^{th}$ resource demands.

3. The system of claim 1, wherein at least one of
   the probabilistic bound $\varepsilon_k$, and
   an over-utilization threshold is $U_k^*$
   is set based on an operating specification of the physical machine.

4. The system of claim 1, further comprising:
   an over commitment placement policy with a maximum value of demand is given by $$N_{max} = \min_K \left\{\left\lfloor \frac{\kappa C_k}{D_k^{max}} \right\rfloor\right\}$$

and a value of $\kappa$ is solved by using $N_{max}$, where, $D_k^{max}$ is a maximum demand on computer resource k, and, $C_k$ is a capacity for the computer resource k.

5. The system of claim 1, further comprising:
   an under commitment policy with an average value of demand is given by $$N_{max} = \min_K \left\{\left\lfloor \frac{\theta C_k}{\mu_{D_k}} \right\rfloor\right\}$$

and a value of $\theta$ is solved by using $N_{max}$, where $D_k^{max}$ is a maximum demand on computer resource k, and, $C_k$ is a capacity for the computer resource k.

6. The system of claim 1, wherein the probability distribution function is automatically updated in response to at least one of:

an additional non-deterministic virtual machine request;
a change in the utilization of the computer resource by the virtual machine;
a change in the utilization of the computer resource by any additional virtual machine which has been added.

7. The system of claim 6, wherein based on the probability distribution function being updated, reevaluating the admission of the additional virtual machine on the physical machine associated within the computing cluster.

8. The system of claim 1, further comprising:
modeling an over-utilization of the computer resource as a probability distribution function, wherein the probability distribution function is a Beta distribution function to represent one of a plurality of probability distribution functions.

9. A non-transitory computer program product for managing requests for an additional virtual machine, the computer program product comprising a computer readable storage medium having computer readable program code embodied therewith, the computer readable program code configured to:
operating at least one virtual machine accessing at least one computer resource associated with at least one physical machine within a computing cluster;
receiving at least one non-deterministic virtual machine request for the computer resource;
determining a maximum number of allowed concurrent computer resource requests in a policy for the physical machine is given by a minimum of a supreme subset of independent computational resource requests and a probability of a utilization of the computer resource, wherein the maximum number of allowed concurrent computer resource requests $N_{max}$ in a policy is given by $$N_{max} = \min_{k \in K}\{\sup\{n \mid F_{Z_k^n}(U_k^*) \geq (1-\varepsilon_k)\}\},$$

where sup is a supremum subset and n is a sum of independent $k^{th}$ computer resource request; and
based on the probability of the utilization of the computer resource being less than a probabilistic bound on an over-utilization of the computer resource, allowing admission of an additional virtual machine on the physical machine associated with the computer resource, otherwise, rejecting the request for the computer resource.

10. The non-transitory computer program product of claim 9, wherein the probability of the utilization of the computer resource is less than an over-utilization threshold $U_k^*$ is given by $$F_{Z_k^n}(U_k^*) \geq \varepsilon_k$$

where the computer resource k associated with the physical machine, the probabilistic bound is $\varepsilon_k$, and $F_{Z_k^n}$ is a function of a sum of n independent $k^{th}$ resource demands.

11. The non-transitory computer program product of claim 9, wherein at least one of
the probabilistic bound $\varepsilon_k$, and
an over-utilization threshold is $U_k^*$
is set based on an operating specification of the physical machine.

12. The non-transitory computer program product of claim 9, further comprising:

an over commitment placement policy with a maximum value of demand is given by $$N_{max} = \min_K\left\{\left\lfloor \frac{\kappa C_k}{D_k^{max}} \right\rfloor\right\}$$

and a value of κ is solved by using $N_{max}$, where, $D_k^{max}$ is a maximum demand on computer resource k, and, $C_k$ is a capacity for the computer resource k.

13. The non-transitory computer program product of claim 9, further comprising:
an under commitment policy with an average value of demand is given by $$N_{max} = \min_K\left\{\left\lfloor \frac{\theta C_k}{\mu_{D_k}} \right\rfloor\right\}$$

and a value of θ is solved by using $N_{max}$, where $D_k^{max}$ is a maximum demand on computer resource k, and, $C_k$ is a capacity for the computer resource k.

14. The non-transitory computer program product of claim 9, further comprising:
modeling an over-utilization of the computer resource as a probability distribution function, wherein the probability distribution function is a Beta distribution function to represent one of a plurality of probability distribution functions.

15. The non-transitory computer program product of claim 14, wherein the probability distribution function is automatically updated in response to at least one of;
an additional non-deterministic virtual machine request;
a change in the utilization of the computer resource by the virtual machine;
a change in the utilization of the computer resource by any additional virtual machine which has been added.

16. The non-transitory computer program product of claim 15, wherein based on the probability distribution function being updated, reevaluating the admission of the additional virtual machine on the physical machine associated within the computing cluster.

17. A computer-implemented method for managing requests for an additional virtual machine, the method comprising:
operating at least one virtual machine accessing at least one computer resource associated with at least one physical machine within a computing cluster;
receiving at least one non-deterministic virtual machine request for the computer resource;
determining a maximum number of allowed concurrent computer resource requests in a policy for the physical machine is given by a minimum of a supreme subset of independent computational resource requests and a probability of a utilization of the computer resource, wherein the maximum number of allowed concurrent computer resource requests $N_{max}$ in a policy is given by $$N_{max} = \min_{k \in K}\{\sup\{n \mid F_{Z_k^n}(U_k^*) \geq (1-\varepsilon_k)\}\},$$

where sup is a supremum subset and n is a sum of independent $k^{th}$ computer resource request; and based on the probability of the utilization of the computer resource being less than a probabilistic bound on an over-utilization of the computer resource, allowing admission of an additional virtual machine on the physical machine associated with the computer resource, otherwise, rejecting the request for the computer resource.

18. The computer-implemented method of claim 17, wherein the probability of the utilization of the computer resource is less than an over-utilization threshold $U_k^*$ is given by $$F_{Z_k^n}(U_k^*) \geq \epsilon_k$$

where the computer resource k associated with the physical machine, the probabilistic bound is $\epsilon_k$, and $F_{Z_k^n}$ is a function of a sum of n independent $k^{th}$ resource demands.

19. The computer-implemented method of claim 17, further comprising:
modeling an over-utilization of the computer resource as a probability distribution function, wherein the probability distribution function is a Beta distribution function to represent one of a plurality of probability distribution functions.

20. The computer-implemented method of claim 17, wherein at least one of
the probabilistic bound $\epsilon_k$, and
an over-utilization threshold is $U_k^*$
is set based on an operating specification of the physical machine.

* * * * *